(12) United States Patent
Wang et al.

(10) Patent No.: US 12,732,400 B2
(45) Date of Patent: Sep. 8, 2026

(54) PASSIVE EQUALIZER WITH FRONT-END LEVEL-SHIFTER (FELS)

(71) Applicant: NVIDIA Corporation, Santa Clara, CA (US)

(72) Inventors: Shawn Wang, Campbell, CA (US); Wenlong Jiang, San Jose, CA (US); Arif Amin, Fremont, CA (US); Dai Dai, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 24 days.

(21) Appl. No.: 18/905,987

(22) Filed: Oct. 3, 2024

(65) Prior Publication Data

US 2026/0100869 A1 Apr. 9, 2026

(51) Int. Cl.
*H04L 25/03* (2006.01)

(52) U.S. Cl.
CPC .. *H04L 25/03878* (2013.01); *H04L 25/03159* (2013.01); *H04L 2025/03522* (2013.01)

(58) Field of Classification Search
None
See application file for complete search history.

(56) References Cited

U.S. PATENT DOCUMENTS 3,864,632 A * 2/1975 Chang ............... H04L 25/03159 708/321
4,242,741 A * 12/1980 Parrish ..................... G01V 1/22 330/84

(Continued)

FOREIGN PATENT DOCUMENTS

CN 1561605 A * 1/2005 ......... H04L 27/2675
CN 1299461 C * 2/2007 ....... H04L 25/03159

(Continued)

OTHER PUBLICATIONS

P. A. Francese et al., "A 16 GB/s receiver with DC wander compensated rail-to-rail AC coupling and passive linear-equalizer in 22 nm CMOS," ESSCIRC 2014—40th European Solid State Circuits Conference (ESSCIRC), Venice Lido, Italy, 2014, pp. 435-438 (Year: 2014).*

(Continued)

*Primary Examiner* — Berhanu Tadese
(74) *Attorney, Agent, or Firm* — Lowenstein Sandler LLP

(57) ABSTRACT

Technologies for providing passive equalization with front-end level shifter (FELS) are described. One receiver device includes an input terminal, an analog signal processing circuit; and a front-end equalizer circuit coupled between the input terminal and the analog signal processing circuit. The front-end equalizer circuit includes a programmable common mode feedback (CMFB) circuit and a passive resistor-inductor-capacitor (RLC) network. The programmable CMFB circuit can receive, from the input terminal, an incoming agnostic common-mode (CM) signal having a first voltage level and a differential peak-to-peak voltage in at least one of an alternating current coupled mode (AC-coupled mode) or a direct current-coupled mode (DC-coupled mode). The programmable CMFB circuit can level shift the incoming agnostic CM signal to a CM signal having a second voltage level using an adjustable current source, the second voltage level corresponding to the analog signal processing circuit.

23 Claims, 16 Drawing Sheets

(56) References Cited

U.S. PATENT DOCUMENTS 6,603,811 B1 * 8/2003 Dobson ............ H04L 25/03159 375/232
6,856,648 B1 * 2/2005 Hyll .................... H04L 27/2675 375/232
6,856,649 B2 * 2/2005 Birru ................ H04L 25/03057 375/233
7,085,315 B1 * 8/2006 Kelton ............. H04L 25/03159 375/229
7,362,802 B2 * 4/2008 Saed ................ H04L 25/03159 375/232
7,499,489 B1 * 3/2009 Ellersick ........... H04L 25/03878 375/229
7,606,547 B1 * 10/2009 Roo ...................... H04L 1/0041 455/295
7,623,570 B2 * 11/2009 Jeong .................... H04L 25/022 370/207
7,697,600 B2 * 4/2010 Maangat ........... H04L 25/03885 327/182
7,957,463 B2 * 6/2011 Shearer, III ....... H04L 25/03159 375/232
8,045,946 B2 * 10/2011 Roo ...................... H04L 1/0041 455/295
8,274,326 B2 * 9/2012 Boecker ........... H04L 25/03885 330/261
8,275,026 B2 * 9/2012 Lee ......................... H04L 63/04 327/558
8,503,961 B1 * 8/2013 Roo ....................... H04B 1/581 455/295
8,798,204 B2 * 8/2014 Chen .................. H04L 25/0276 375/257
8,880,017 B1 * 11/2014 Roo ......................... H04B 3/23 455/295
8,958,469 B1 * 2/2015 Harris ............... H04L 25/03159 375/230
8,964,904 B2 * 2/2015 Ciacci ..................... H04L 25/06 375/322
9,025,691 B1 * 5/2015 Wu .................. H04L 25/03159 375/267
9,319,004 B2 * 4/2016 Bandyopadhyay ....... H03F 1/34
9,667,455 B1 * 5/2017 Levakov ........... H04L 25/03891
9,966,908 B1 * 5/2018 Carey ................. H03F 3/45475
10,135,646 B2 * 11/2018 Lee .................. H04L 25/03057
10,581,650 B2 * 3/2020 Hashemi ........... H04L 25/03949
11,522,736 B2 * 12/2022 Park .................... H03F 3/45475
11,611,458 B1 * 3/2023 Balan ................ H04L 25/03057
11,665,029 B2 * 5/2023 Balan ................ H04L 25/03006 375/317
12,425,277 B2 * 9/2025 Balan ................ H04L 25/03057
2004/0161066 A1 * 8/2004 Hwang ............ H04L 25/03159 375/350
2005/0053128 A1 * 3/2005 Shearer ............ H04L 25/03159 375/232
2005/0129100 A1 * 6/2005 Li ..................... H04L 25/03159 375/222
2006/0045176 A1 * 3/2006 Moughabghab ............................ H04L 25/03885 375/232
2008/0219340 A1 * 9/2008 Saed ................ H04L 25/03159 375/232
2010/0293442 A1 * 11/2010 Del Angel ........ H04L 25/03267 714/792
2010/0296570 A1 * 11/2010 Gross ............... H04L 25/03019 375/232
2010/0299582 A1 * 11/2010 Del Angel ........ H04L 25/03267 714/792
2012/0049946 A1 * 3/2012 Boecker ............. H03F 3/45179 327/563
2013/0064326 A1 * 3/2013 Chen .................. H04L 25/0276 375/316
2014/0145785 A1 * 5/2014 Bandyopadhyay ....... H03F 1/34 330/69
2014/0192934 A1 * 7/2014 Ciacci ...................... H04B 1/16 375/329
2017/0070405 A1 * 3/2017 Hashemi ........... H04L 25/03949
2022/0141056 A1 * 5/2022 Park .................... H04L 25/0276 375/233
2022/0182265 A1 * 6/2022 Xu .................... H04L 27/26532
2023/0246886 A1 * 8/2023 Kim ........................ H04L 27/38 375/233
2025/0358154 A1 * 11/2025 Arikawa ........... H04L 25/03006

FOREIGN PATENT DOCUMENTS

CN 101048955 A * 10/2007 ............. H04L 27/01
CN 106575945 A * 4/2017 ........... H03F 1/0272
CN 108886502 A * 11/2018 ......... H04L 25/0212
CN 106575945 B * 4/2019 ........... H03F 1/0272
CN 110890912 A * 3/2020 ....... H04L 25/03159
CN 108566350 B * 2/2021 ....... H04L 25/03159
CN 108886502 B * 12/2021 ......... H04L 25/0228
CN 115576384 A * 1/2023 ......... H04L 25/0276
CN 116938653 A * 10/2023 ............. H04L 25/06
CN 119561811 A * 3/2025 ......... H04L 25/4906
CN 119561811 B * 5/2025 ......... H04L 25/4906
DE 102004012828 B3 * 8/2005 ....... H04L 25/03159
EP 0700189 A1 * 3/1996 ....... H04L 25/03159
EP 1302017 B1 * 7/2008 ......... H04L 27/2675
EP 2753038 A2 * 7/2014 ............... H04B 1/16
EP 2753038 B1 * 7/2017 ............. H04L 25/06
EP 3557826 A1 * 10/2019 ......... H04L 25/0307
JP 2007505524 A * 3/2007 ............. H04B 7/005
JP 4495159 B2 * 6/2010 ............. H04L 27/01
JP 2025174462 A * 11/2025 ....... H04L 25/03159
KR 20060076014 A * 7/2006 ....... H04L 25/03159
KR 100626370 B1 * 9/2006 ....... H04L 25/03159
KR 20140041915 A * 4/2014 ............... H04B 3/06
KR 20240130587 A * 8/2024 ......... H03K 19/0944
SE 522688 C2 * 2/2004 ......... H04L 27/2675
TW 201101677 A * 1/2011 ......... H03F 3/45183
TW I406542 B * 8/2013 ............. H04L 27/01
WO WO-0207399 A2 * 1/2002 ......... H04L 27/2675
WO WO-2005027384 A1 * 3/2005 ............. H04B 7/005
WO WO-2023237182 A1 * 12/2023 ....... H04L 25/03165

OTHER PUBLICATIONS

R. Rothe et al., "Sample and Average Common-Mode Feedback in a 101 nW Acoustic Amplifier," 2020 IEEE Symposium on VLSI Circuits, Honolulu, HI, USA, 2020, pp. 1-2 (Year: 2020).*

Poon et al., A_1.24-pJ_b_112-Gb_s_870_Gb_s_Mm_Transceiver_for_In-Package_Links_in_7-nm_FinFET, IEEE 2022 (Year: 2022).*

Toifl et al., A_2.6_mW_Gbps_12.5_Gbps_RX_With_8-Tap_Switched-Capacitor_DFE_in_32_nm_CMOS, IEEE 2012 (Year: 2012).*

C. Bai, J. Yang and J. Wu, "A highly linear programmable gain amplifier with level shifter and class AB output stage for bluetooth low energy," 2015 Asia-Pacific Microwave Conference (APMC), Nanjing, China, 2015, pp. 1-3, (Year: 2015).*

A. Rajesh, B. L. Raju and K. C. K. Reddy, "A low power high efficiency BPSK transceiver using level converter for communication applications," 2017 IEEE International Conference on Power, Control, Signals and Instrumentation Engineering (ICPCSI), Chennai, India, 2017, pp. 2625-2629, (Year: 2017).*

Pola Ariel L, Cousseau Juan E, Agazzi Oscar E, Hueda Mario R. Efficient decision feedforward equalizer with parallelizable architecture In2013 IEEE International Symposium on Circuits and Systems (ISCAS) May 19, 2013 (pp. 2771-2774). IEEE. (Year: 2013).*

M. Kim, J. Bae, U. Ha and H.-J. Yoo, "A 24-mW 28-GB/s wireline receiver with low-frequency equalizing CTLE and 2-tap speculative DFE," 2015 IEEE International Symposium on Circuits and Systems (ISCAS), Lisbon, Portugal, 2015, pp. 1610-1613, (Year: 2015).*

Francese, et al., "A 16 GB/s Receiver with DC Wander Compensated Rail-to-Rail AC Coupling and Passive Linear-Equalizer in 22 nm CMOS," ESSCIRC 2014—40th European Solid State Circuits

(56) References Cited

OTHER PUBLICATIONS

Conference (ESSCIRC), Venice Lido, Italy, 2014, 2014, 435-438, doi: 10.1109/ESSCIRC.2014.6942115.

Poon, et al., "A 1.24-pJ/b 112-GB/s (870 GB/s/Mm) Transceiver for In-Package Links in 7-nm FinFET," IEEE Journal of Solid-State Circuits, vol. 57, No. 4, Apr. 2022, 1109-1210.

Toifl, et al., "A 2.6 mW/Gbps 12.5 Gbps RX With 8-Tap Switched-Capacitor DFE in 32 nm CMOS," IEEE Journal of Solid-State Circuits, vol. 47, No. 4, Apr. 2012, 897-910.

* cited by examiner

PASSIVE EQUALIZER WITH FRONT-END LEVEL-SHIFTER (FELS)

TECHNICAL FIELD

At least one embodiment generally pertains to communication systems, and more specifically, but not exclusively, to a receiver device with programmable common-mode feedback and passive equalization circuits.

BACKGROUND

Communications systems transmit and receive signals at a high data rate (e.g., up to 300 Gbits/sec). High-speed transmissions exhibit significant noise attributes (e.g., due to the transmission medium) that require the use of communication devices (e.g., transmitters and receivers) configured to perform digital pre-processing by a transmitter device and post-processing by a receiver device. Communication standards, such as the PCIe and M-PHY standards, need independent control of common-mode voltages at the transmitter and the receiver, with both direct current (DC) and alternating current (AC) coupled modes. Also, the receiver needs to support wide incoming amplitude and loss range. Some conventional solutions have been directed to solving the incoming agnostic common-mode (CM) issues. Some conventional solutions have been directed to solving automatic gain control (AGC) for a wide tuning range. These conventional solutions, however, do not solve both of these issues together, while providing a wide range equalization at the same time.

BRIEF DESCRIPTION OF DRAWINGS

Various embodiments in accordance with the present disclosure will be described with reference to the drawings, in which.

DETAILED DESCRIPTION

Figure 1A:
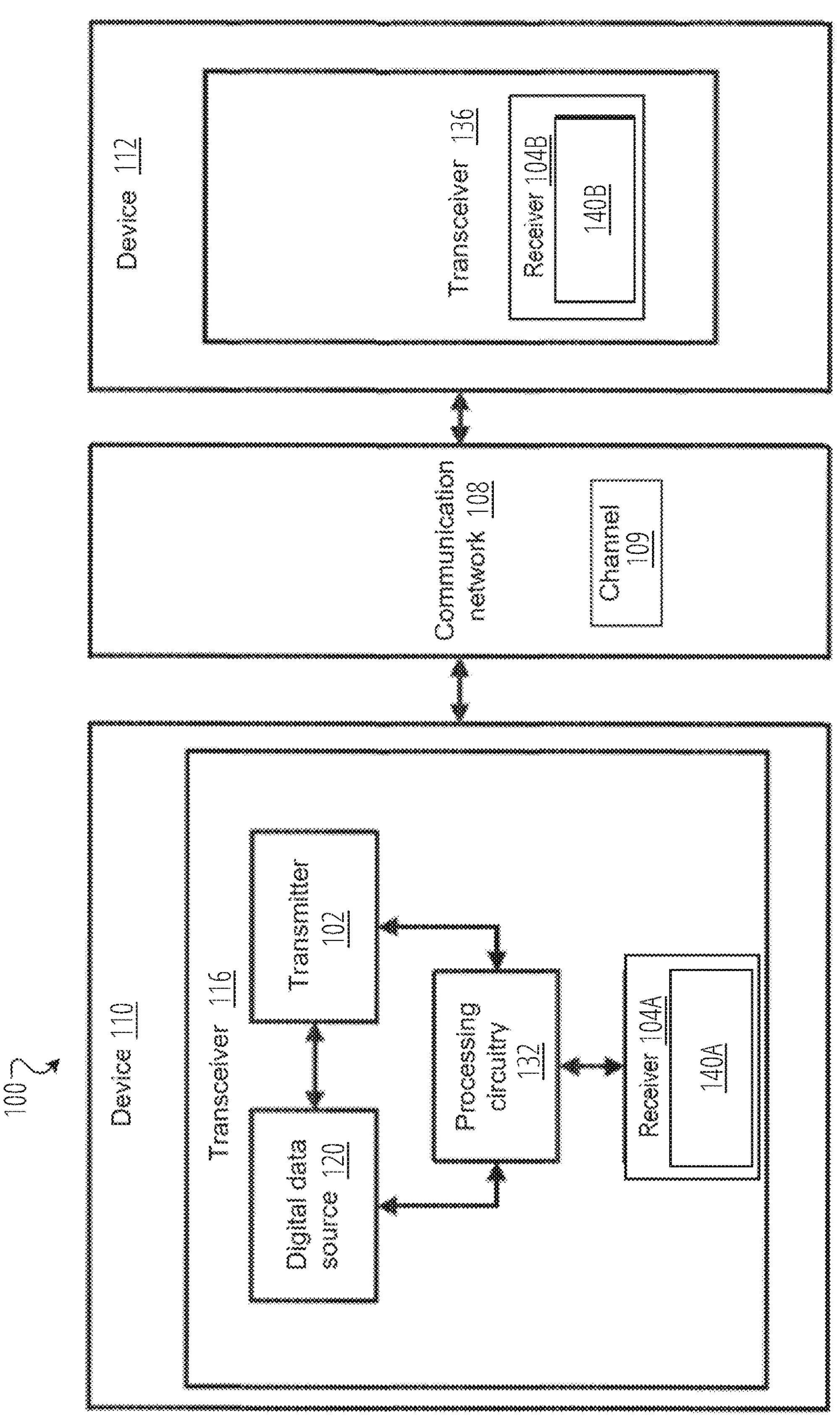
FIG. 1A illustrates an example communication system with a front-end equalizer circuit with a front-end level-shifter (FELS) common-mode-feedback (CMFB) circuit (FELS CMFB circuit) according to at least one embodiment.

As described above, communication standards, such as the PCIe and M-PHY standards, need independent control of common-mode voltages at the transmitter and the receiver, with both direct current (DC) and alternating current (AC) coupled modes. Also, the receiver needs to support wide incoming amplitude and loss range. For example, the PCIe standard needs independent control of the common-mode voltages at the transmitter and at the receiver, which facilitates interoperability among high-speed serializer/deserializer circuits (SerDes circuits). The M-PHY standard needs the receiver to support agnostic incoming CM from 80-310 millivolts (mV). The on-chip AC-coupling capacitor connecting in series with an active Continuous-Time Linear Equalizer (CTLE) requires a DC path to compensate for baseline wander (in DC-coupled mode), while level shifting to the CTLE's desired CM (also referred to as target CM). Furthermore, the PCIe standard requires support for a transmit (Tx) differential peak-to-peak launching amplitude from 800 mV to 1.3V.

These problems are challenging because they require a receiver design that can handle various common-mode voltages, attenuation levels, and channel characteristics without compromising the signal integrity and performance. Previous solutions have attempted to address some aspects of this problem, but not all of them together. For example, some solutions have proposed methods to deal with the incoming agnostic common-mode issue, such as using a level shifter or a common-mode feedback (CMFB) circuit. However, these solutions either have limited tuning range, high power consumption, or complex circuitry. Other solutions have proposed methods to provide automatic gain control (AGC) for wide tuning range, such as using a Variable Gain Amplifier (VGA) or a capacitor divider network. However, these solutions either have poor return loss, limited bandwidth, or degraded equalization performance. These prior solutions, however, do not solve both of these issues together, while providing a wide range equalization at the same time.

Aspects and embodiments of the present disclosure address the above deficiencies and others by providing independent control of the common-mode voltages at a transmitter and at a receiver for various communication standards, such as PCIe and M-PHY standards, with both DC- and AC-coupled modes. Aspects and embodiments of the present disclosure address the above deficiencies and others by providing wide range tuning of the receiver for different incoming amplitude and loss scenarios. Aspects and embodiments of the present disclosure provide a receiver design that can solve the problems described above by implementing an efficient FELS CMFB circuit and a passive RLC network.

Aspects and embodiments of the present disclosure can support agnostic incoming Tx common mode signals for M-PHY, PCIe, and USB modes with both AC- and DC-coupled channels. Aspects and embodiments of the present disclosure can support AGC for wide range attenuation from 1-7 dB while keeping good return loss and bandwidth. Aspects and embodiments of the present disclosure can support wide range equalization (EQ) and provide long tail equalization for both high and low loss channels. The implementations of the FELS CMFB circuit and the passive RLC network are different compared to previous solutions, as the FELS CMFB circuit tunes the level shifting through an adjustable current source while previous solutions tuned voltage through an operational amplifier (op-amp) with feedback, which reduces the power consumption and complexity of the circuit. The programmable attenuation capacitor divider network not only provides wideband attenuation, but also provides boost for long-tail equalization (LTEQ) and low-pass filtering (LPF) for low loss or re-driver channels, which improves the signal integrity and performance of the receiver. Aspects and embodiments of the present disclosure can implement different offset calibration methods for AC-coupled case and DC-coupled case, respectively, depending on the incoming common mode property, while the previous solutions calibrated offset through the other stages in the receiver, which enhances the accuracy and robustness of the offset compensation.

Aspects and embodiments of the present disclosure can support wide range input CM from 0V to 500 mV, with 6 dB wide range programmable attenuation, as well as 3-dB passive LTEQ and 2 dB LPF. Aspects and embodiments of the present disclosure can be adapted to subsequent active CTLE (or VGA), which boosts the response (i.e., gain or amplification of a signal's frequency components) up to the Nyquist frequency. Aspects and embodiments of the present disclosure are generic to support various communication standards, such as the PCIe, M-PHY, USB standards, etc.

Aspects and embodiments of the present disclosure can meet the PCIe specification that necessitates autonomous management of common-mode voltages at both the transmitter and receiver, accommodating both DC- and AC-coupling methods. Aspects and embodiments of the present disclosure can support the M-PHY specification's requirement of transmission common mode voltage neutrality ranging from 80-310 mV and necessitating level shifting. Aspects and embodiments of the present disclosure can meet the PCIe standard's requirement to support transmission differential peak-to-peak launch amplitude between 800 mV and 1.3V. Aspects and embodiments of the present disclosure can provide an on-die AC capacitor and the passive RLC network, including a capacitive divider network that offers a broad spectrum of AC attenuation capabilities, ranging from 1 to 7 dB, and a resistor divider that produces an extensive range of DC attenuation, aligning it with the AC attenuation to maintain a consistent response across the entire frequency domain (i.e., a flat response across the entire frequency spectrum). Aspects and embodiments of the present disclosure can detect incoming agnostic common mode (CM) voltages in a range of 0-500 mV, for example, and apply the necessary level shift to align with the preferred common mode for the subsequent active equalization circuitry, such as a subsequent active CTLE. Aspects and embodiments of the present disclosure can add LTEQ and LPF through the passive capacitive divider network of the passive RLC network. Aspects and embodiments of the present disclosure can include squelch capabilities by including squelch circuits tailored to calibrate the offsets present in both the FELS CMFB circuit and the subsequent equalization circuits (e.g., the subsequent CTLE) while providing sufficient isolation from input traffic data. Aspects and embodiments of the present disclosure can implement a CM buffer to track the agnostic incoming common mode in the DC-coupling mode during the calibration of FELS offsets.

Therefore, advantages of the receivers, systems, and methods implemented in accordance with some embodiments of the present disclosure include, but are not limited to, supporting wide range of input CM signals, various protocols and standards, and wide range of AGC and long tail equalization. Other advantages will be apparent to those skilled in the art of signaling, as will be discussed hereinafter.

FIG. 1A illustrates an example communication system 100 with a front-end equalizer circuit 140, in accordance with at least some embodiments. The system 100 includes a device 110, a communication network 108 including a communication channel 109, and a device 112. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices also connected to a common type of communication network 108. According to embodiments, the receiver 104A, 104B of devices 110 or 112 may correspond to a graphics processing unit (GPU), a switch (e.g., a high-speed network switch), a network adapter, a central processing unit (CPU), a data processing unit (DPU), etc. As another specific but non-limiting example, the devices 110 and 112 may correspond to servers offering information resources, services and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In other embodiments, the communication network 108 can be a Peripheral Component Interconnect Express (PCIe) interconnect. PCIe is a high-speed interface standard used to connect various hardware components. It can be an interconnect for devices such as graphics cards (GPUs), solid-state drives (SSDs), network cards, and other peripherals. PCIe offers a scalable, high-speed, and point-to-point connection between devices, including CPUs, GPUs, memory, and the like. In other embodiments, the communication network 108 can be a high-speed interconnect, such as an interconnect that deploys the NVLink technology. The NVLink interconnect can be a GPU-GPU interconnect used between GPUs, a CPU-GPU interconnect between GPUs and CPUs, or an interconnect used between other devices. NVLink offers a higher bandwidth and lower latency than traditional PCIe connections, which are typically used in computing hardware. NVLink is especially useful in scenarios that require massive parallel processing, such as artificial intelligence (AI), machine learning, deep learning, high-performance computing (HPC), and data analytics. For example, in NVIDIA's Deep GPU Xceleration (DGX) systems and high-end gaming or AI workstations, NVLink helps GPUs exchange data at speeds that are necessary for demanding tasks like real-time ray tracing or training neural networks. The NVLink capacity can allow more GPUs to communicate through it. In one specific, but non-limiting example, the communication network 108 is a network that enables data transmission between the devices 110 and 112 using data signals (e.g., digital, optical, wireless signals). The embodiments described herein can be utilized in a system with a high-speed, scalable switch, such as a switch using the NVSwitch technology. NVSwitch is a high-speed, scalable switch developed by NVIDIA that facilitates data communication between multiple GPUs in a system, allowing them to work together more efficiently by providing high-bandwidth, low-latency interconnections. The NVSwitch serves as a central hub or high-bandwidth fabric that interconnects all the GPUs in a system, enabling each GPU to communicate with every other GPU quickly and efficiently. The NVSwitch can be coupled between other types of devices, such as CPUs, accelerators, memory, or the like. The NVSwitch can be used for tasks requiring intense computation and collaboration between multiple GPUs, such as AI model training, scientific simulations, and large-scale data processing. The embodiments described herein can be used in a high-performance computing system, such as a computing system modeled after NVIDIA's DGX systems, which are designed specifically for artificial intelligence (AI), deep learning, and high-performance computing (HPC) workloads. DGX systems are optimized for large-scale GPU computation and parallel processing, integrating multiple GPUs, high-bandwidth interconnects, and software frameworks tailored for AI and HPC tasks. In at least one embodiment, a system for high-speed network communication includes a processing unit, a network interface comprising a receiver or transceiver with the front-end equalizer circuit, as described herein. The processing unit can include a CPU, a GPU, a DPU, a network adapter, a network switch, an NVLink switch, or the like.

Other examples for the communication network 108 can include other chip-to-chip or die-to-die interconnects, such as Ground-Referenced Signaling (GRS), LPI (low power interface) or LLI (low latency interface).

The device 110 includes a transceiver 116 for sending and receiving signals, for example, data signals. The data signals may be digital or optical signals modulated with data or other suitable signals for carrying data. The transceiver 116 may include a digital data source 120, a transmitter 102, a receiver 104A, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104B of device 112.

The receiver 104A, 104B of device 110 and device 112 may include suitable hardware and/or software for receiving signals, for example, data signals from the communication network 108. For example, the receivers 104A, 104B may include components for receiving processing signals to extract the data for storing in a memory. In at least one embodiment, the receiver 104B includes an receiver analog front-end circuit (RX AFE circuit) having a front-end equalizer circuit 140B with a programmable FELS CMFB circuit and a passive RLC network. In another embodiment, the receiver 104A also includes an RX AFE circuit having a front-end equalizer circuit 140A with a FELS CMFB circuit and a passive RLC network. The receiver 104B receives an incoming signal and samples the incoming signal to generate samples, such as using an analog-to-digital converter (ADC). The RX AFE circuit, including the front-end equalizer circuit 140B with a FELS CMFB circuit and a passive RLC network, can be coupled between a terminal or node and the ADC. Additional details of the front-end equalizer circuit 140, including a FELS CMFB circuit and a passive RLC network, are discussed in more detail below with respect to FIG. 2.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application specific integrated circuit (ASIC). Other non-limiting examples of the processing circuitry 132 include an Integrated Circuit (IC) chip, a CPU, a GPU, a DPU, a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The channel 109 can be PCIe, NVLink, Ethernet, InfiniBand, Ground Reference Signal (GRS), Chip-to-Chip (C2C), Die-to-Die (D2D), or the like. The same or similar structure of the transceiver 116 may be applied to transceiver 136, and thus, the structure of transceiver 136 is not described separately.

Although not explicitly shown, it should be appreciated that devices 110 and 112 and the transceivers 116 and 136 may include other processing devices, storage devices, and/or communication interfaces generally associated with computing tasks, such as sending and receiving data.

Figure 1B:
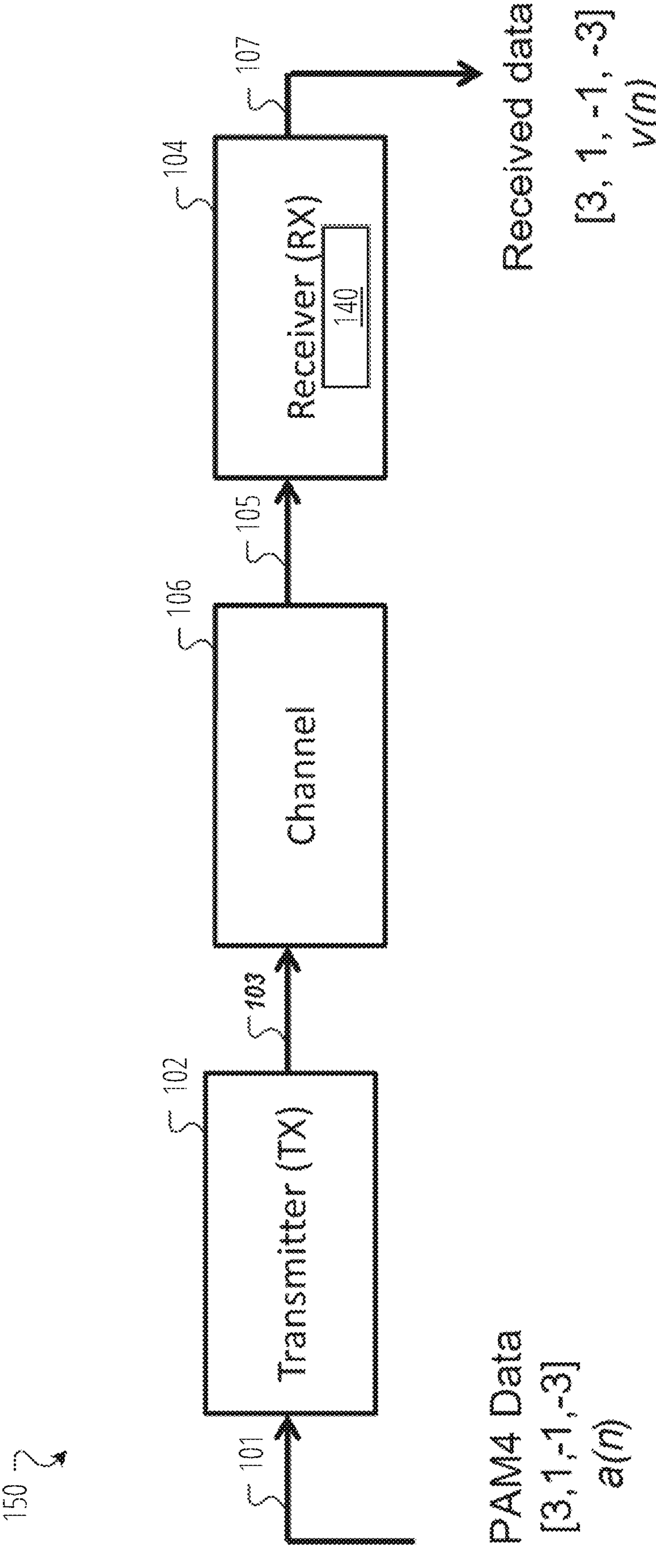
FIG. 1B is a block diagram of a communication system employing a passive equalizer circuit with a FELS CMFB circuit in a receiver device, according to at least one embodiment.

FIG. 1B illustrates a block diagram of an example communication system 150 employing a front-end equalizer circuit 140 in a receiver 104, according to at least one embodiment. In the example shown in FIG. 1B, a PAM level-4 (PAM4) modulation scheme is employed with respect to the transmission of a signal (e.g., digitally encoded data) from a transmitter (TX) 102 to a receiver (RX) 104 via a communication channel 106 (e.g., a transmission medium). The communication channel 106 can be PCIe, NVLink, Ethernet, InfiniBand, GRS, C2C, D2D, or the like. In this example, the transmitter 102 receives 101 an input data (i.e., the input data at time n is represented as "a(n)"), which is modulated in accordance with a modulation scheme (e.g., PAM4) and sends the signal a(n) including a set of data symbols (e.g., symbols −3, −1, 1, 3, wherein the symbols represent coded binary data). It is noted that while the use of the PAM4 modulation scheme is described herein by way of example, other data modulation schemes can be used in accordance with embodiments of the present disclosure, including for example, a non-return-to-zero (NRZ) modulation scheme, PAM3, PAM7, PAM8, PAM16, etc. For example, for an NRZ-based system, the transmitted data symbols consist of symbols −1 and 1, with each symbol value representing a binary bit. This is also known as a PAM level-2 or PAM2 system as there are 2 unique values of transmitted symbols. Typically, a binary bit 0 is encoded as −1, and a binary bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11).

The communication channel 106 is a destructive medium in that the channel acts as a low pass filter which attenuates higher frequencies more than it attenuates lower frequencies, introduces inter-symbol interference (ISI) and noise from crosstalk, from power supplies, from Electromagnetic Interference (EMI), or from other sources. The communication channel 106 can be over serial links (e.g., a cable, printed circuit boards (PCBs) traces, copper cables, optical fibers, or the like), read channels for data storage (e.g., hard disk, flash solid-state drives (SSDs), high-speed serial links, deep space satellite communication channels, applications, or the like.

As described above, in some communication systems, the transmitter 102 sends the signal 103 as a data signal with or without a transmitter clock used to generate the data signal. The receiver (RX) 104 receives an incoming signal 105 over the communication channel 106. The incoming signal 105 can be degraded and attenuated by the communication channel 106 and include noise. The receiver 104 can output a received signal 107, "v(n)," including the set of data symbols (e.g., symbols −3, −1, 1, 3, wherein the symbols represent coded binary data). The front-end equalizer circuit 140 can be used to compensate for temperature drift in the receiver 104. The receiver 104 can include an RX AFE circuit, such as a Continuous-Time Linear Equalizer (CTLE) or a Variable Gain Amplifier (VGA). The front-end equalizer circuit 140 can include a programmable FELS CMFB circuit and a passive RLC network. Additional details of the front-end equalizer circuit 140 are discussed in more detail below with respect to FIG. 2.

Figure 2:
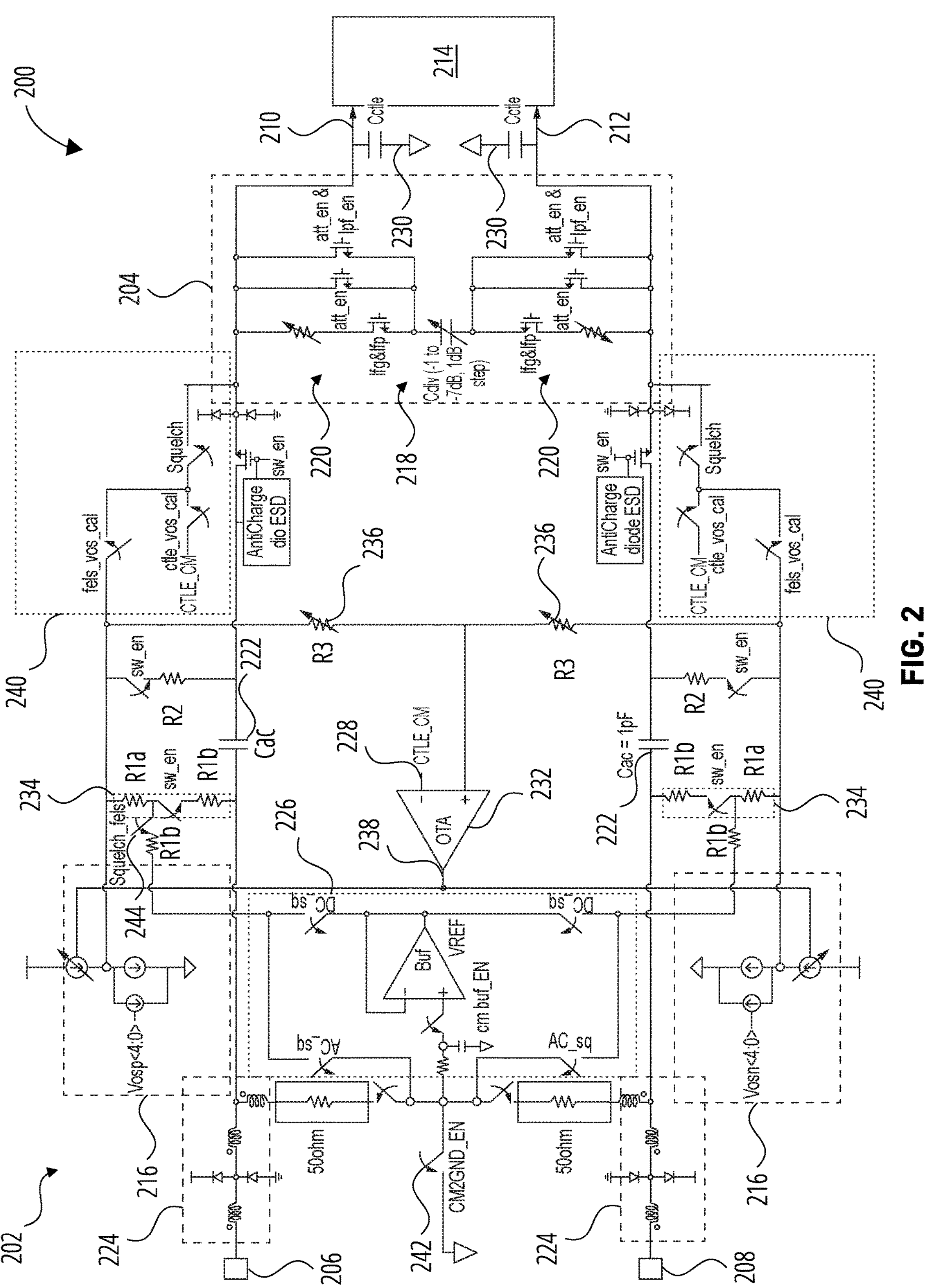
FIG. 2 is a circuit diagram of a front-end equalizer circuit having a FELS CMFB circuit and a passive resistor-inductor-capacitor (RLC) network according to at least one embodiment.

FIG. 2 is a circuit diagram of a front-end equalizer circuit 200 having a FELS CMFB circuit 202 and a passive RLC network 204 according to at least one embodiment. The front-end equalizer circuit 200 is an analog circuit that can be used in a receiver device (also referred to as a receiver circuit)(e.g., a receiver analog front-end circuit (RX AFE circuit) having an analog signal processing circuit 214, such as a Continuous-Time Linear Equalizer (CTLE) and Variable Gain Amplifier (VGA). The front-end equalizer circuit 200 is coupled to differential input terminals—input terminal 206 and input terminal 208—of the receiver device. The front-end equalizer circuit 200 also has differential output nodes—output node 210 and output node 212. The differential output nodes are coupled to input nodes of the analog signal processing circuit 214. As such, the front-end equalizer circuit 200 is coupled between the differential input terminals and the analog signal processing circuit 214.

As illustrated in FIG. 2, the front-end equalizer circuit 200 includes the FELS CMFB circuit 202 and the passive RLC network 204. The FELS CMFB circuit 202 is a programmable CMFB circuit. The FELS CMFB circuit 202 can receive, from the input terminals 206, 208, an incoming agnostic common-mode (CM) signal. The CM signal can have a first voltage level, for example, between 0 and 500 millivolts (mV) and a differential-peak-to-peak voltage between 800 mV and 1.3 V in either an alternating current coupled mode (AC-coupled mode) or a direct current-coupled mode (DC-coupled mode). The FELS CMFB circuit 202 can level shift the incoming agnostic CM signal to a CM signal having a second voltage level using an adjustable current source 216. The second voltage level can correspond to the front-end equalizer circuit 200. The second voltage level can be set to a target CM 228 for the analog signal processing circuit 214. In addition to the adjustable current sources 216, the FELS CMFB circuit 202 includes an operational amplifier 232 with a first input (inverting input) coupled to the target CM 228 and a second input (non-inverting input) coupled to a voltage divider of a first resistor 234 (R1) (labeled R1a and R1b) and a third resistor 236 (R3). The operational amplifier 232 can output a control signal 238 as common mode feedback (CMFB) to the adjustable current sources 216. The third resistor 236 can be a variable resistor. The FELS CMFB circuit 202 can provide level shifting through the first resistor 234 (R1a/R1b) using the adjustable current source 216 that is controlled by the control signal 238 from the operational amplifier 232.

In at least one embodiment, the FELS CMFB circuit 202, in a DC-coupled mode, can provide a DC gain according to the following Equation 1:

$$DCgain = \frac{R3}{R1 + R3}$$

In at least one embodiment, the FELS CMFB circuit 202, in an AC-coupled mode, can provide an AC gain according to the following Equation 2:

$$ACgain = \frac{C_{ac}}{C_{ac} + C_{div} + C_{ctle} + C_{par}},$$

where $C_{ac}$ represents a capacitance value of the AC capacitor 222 (and AC capacitor 222), $C_{div}$ represents a capacitance value of the programmable capacitor divider network 218, $C_{ctle}$ represents a capacitance value of a load capacitor 230 of the analog signal processing circuit 214, and Cpar represents a parasitic capacitance value.

The passive RLC network 204 can provide AC attenuation and DC attenuation over an attenuation range while providing boost for long tail equalization (LTEQ) and low-pass filtering (LPF) for the analog signal processing circuit 214. For example, the attenuation range may be from approximately between 1 to 7 decibels (dB). The passive RLC network 204 can provide passive linear equalization (low frequency (LF) equalization) and LPF. The passive linear equalization refers to the use of passive components (such as resistors, capacitors, and inductors) to modify the frequency response of a signal to achieve a desired linear characteristic, typically to counteract the effects of signal degradation like attenuation or distortion that occur over a transmission medium. This is done without using active components like transistors or operational amplifiers, which means the equalization does not provide gain but rather adjusts the amplitude of different frequency components. LF Equalization typically involves boosting or attenuating the lower frequencies in a signal. In the context of passive linear equalization, LF equalization might involve adjusting the impedance characteristics of the circuit at lower frequencies to compensate for losses or distortions that typically affect the low-frequency range. For example, if a transmission line or channel causes attenuation at low frequencies, a passive LF equalization circuit could use inductors or a series of RC networks to increase the gain of these frequencies, effectively balancing the overall frequency response. LPF is a type of filter that allows low-frequency signals to pass through while attenuating higher-frequency components. In passive LPF design, components like resistors and capacitors are used to create a network that attenuates frequencies above a certain cutoff point. For example, a simple RC low-pass filter consists of a resistor and a capacitor in series, with the output taken across the capacitor. This setup allows signals with frequencies lower than the cutoff frequency to pass through relatively unaffected, while higher frequencies are reduced in amplitude. LF Equalization and LPF can be used together in a passive linear equalization network to tailor the frequency response of a signal. For example, an LPF can be used to remove unwanted high-frequency noise while simultaneously implementing LF equalization to restore or adjust low-frequency content that has been degraded during transmission. The LF equalization and LPF can be used to maintain a flat frequency response for signal integrity. In general, the passive RLC network 204 can include a set of one or more passive filters, such as resistors, capacitors, and inductors, connected in various configurations like ladder networks, cascaded second-order sections, or multiple feedback topologies. These components create frequency-dependent impedance paths that selectively attenuate or amplify certain frequencies to achieve the desired equalization effect. The passive RLC network 204 is a passive in that all elements are non-dissipative and do not require external power sources.

As illustrated in FIG. 2, the passive RLC network 204 is a divider network circuit, including a programmable capacitor divider network 218 and a programmable resistor divider network 220. The AC capacitor 222 and AC capacitor 222, and programmable capacitor divider network 218 can provide the AC attenuation to the CM signal (e.g., between 1 to 7 dB) in the AC-coupled mode, whereas the programmable resistor divider network 220 can provide DC attenuation in the DC-coupled mode to match the AC attenuation in the AC-coupled mode for a flat response across whole frequency spectrum. It should be noted that a more detailed version of the passive RLC network 204 is illustrated and described with respect to FIG. 3.

In at least one embodiment, the divider network circuit is a circuit that includes both a capacitive divider network and a resistive divider network and leverages the properties of capacitors and resistors to control and distribute voltage levels within the same circuit. The programmable resistor divider network 220 can include two or more resistors connected in series across a voltage source. The voltage at the junction between the resistors is a fraction of the total voltage, determined by the ratio of the resistances. The programmable resistor divider network 220 can be used to provide a stable reference voltage or to scale down a voltage for measurement or further processing. The programmable capacitor divider network 218 operates similarly to the programmable resistor divider network 220 but uses capacitors instead of resistors. When connected in series across an AC voltage source, the voltage at the junction between the capacitors is determined by the capacitance values. The programmable capacitor divider network 218 can be used in the AC-coupled mode. The divider network circuit can be used for DC voltage scaling or biasing by the programmable resistor divider network 220, while the programmable capacitor divider network 218 could be used to manage AC signal levels or to provide frequency-dependent behavior. For example, the programmable resistor divider network 220 could set a bias voltage for an AC signal entering the circuit, while the programmable capacitor divider network 218 could adjust the amplitude of that AC signal or create a specific frequency response. The programmable resistor divider network 220 could establish a DC operating point, while the capacitive divider handles the AC signal, ensuring that only the desired frequency components are passed or attenuated.

In at least one embodiment, the front-end equalizer circuit 200 includes t-coil inductors 224 coupled to the input terminal 206 and input terminal 208. The t-coil inductor 224 can improve return loss (e.g., per $S_{21}$ and $S_{11}$ specifications).

In at least one embodiment, the front-end equalizer circuit 200 includes FELS switch array 240 for voltage offset calibration for the analog signal processing circuit 214 (e.g., CTLE) and the FELS voltage offset of the FELS CMFB circuit 202.

In at least one embodiment, the front-end equalizer circuit 200 includes a switch 242 that can be enabled to couple the CM voltage to ground in the AC-coupled mode. The switch 242 can be disabled to keep the CM voltage floating in the DC-coupled mode.

In at least one embodiment, the front-end equalizer circuit 200 includes a CM buffer 226 to track an incoming agnostic CM signal in the DC-coupled mode during a FELS squelch operation. In at least one embodiment, the front-end equalizer circuit 200 includes a squelch circuit 244 to enable a squelch operation for the FELS CMFB circuit 202. In at least one embodiment, the FELS CMFB circuit 202 can use first squelch circuits for the AC-coupled mode to calibrate a first offset of the FELS CMFB circuit 202, and second squelch circuits for the DC-coupled mode to calibrate a second offset of the analog signal processing circuit 214.

In at least one embodiment, the FELS CMFB circuit 202 can provide a DC path to compensate a baseline wander of the front-end equalizer circuit 200, while level shifting the incoming agnostic CM signals to the second voltage level.

In at least one embodiment, the passive RLC network 204 includes the AC capacitors 222, the T-coil inductors 224, a programmable capacitor divider network 218, and a programmable resistor divider network 220. The AC capacitors 222 and the programmable capacitor divider network 218 can provide AC attenuation to the CM signal in the AC-coupled mode. The programmable resistor divider network 220 can provide DC attenuation in the DC-coupled mode to match the AC attenuation in the AC-coupled mode. This can help provide a flat response across the desired frequency spectrum.

It should be noted that the analog signal processing circuit 214 is illustrated as a CTLE as the subsequent analog signal processing circuit. CTLE is a type of analog circuit used to compensate for signal degradation, particularly in high-speed communication systems. Signal degradation, such as attenuation and distortion, occurs as a signal travels through a medium (like a PCB trace, cable, or optical fiber), especially at higher frequencies. The CTLE is designed to counteract these effects by providing frequency-dependent gain to the signal. After the CTLE there can be digital front-end circuits or blocks, such as a AGC block and an EQ block. The AGC block can control the attenuation provided by the passive RLC network 204. The EQ block can control LE or LPF provided by the passive RLC network 204. The load capacitors 230 can be coupled to the inputs of the analog signal processing circuit 214. In other embodiments, the analog signal processing circuit 214 can be a VGA having an input coupled to the front-end equalizer circuit 200. The input can be either a single-ended or differential. In many AFE circuits, the incoming signal strength can vary significantly due to factors like distance, interference, or environmental conditions. The VGA can help manage these variations by adjusting the gain in real-time, ensuring that the output signal maintains a consistent amplitude suitable for further processing. The VGA is an electronic amplifier that can adjust its gain dynamically, which means it can amplify input signals by different amounts based on control inputs while operating in offset calibration. The VGA allows the gain (amplification factor) of an analog signal to be adjusted electronically, which is essential for maintaining signal integrity across varying signal strengths and conditions. The VGA can be part of an Automatic Gain Control (AGC) loop. The AGC circuit dynamically adjusts the VGA's gain to maintain a constant output level, even as the input signal varies. By optimizing the gain, the VGA can help maintain a high signal-to-noise ratio (SNR). If the signal is too weak, increasing the gain can help amplify it above the noise floor. Conversely, if the signal is too strong, reducing the gain prevents distortion and saturation of subsequent stages in the AFE. The VGA can be designed with either linear or logarithmic gain control characteristics, where Linear VGAs adjust the gain in a linear fashion, meaning that a linear change in the control signal results in a linear change in gain, and Logarithmic VGAs adjust the gain on a logarithmic scale, which is useful in applications where the signal level varies exponentially. The gain of a VGA can be controlled either by an analog control voltage (analog-controlled VGA) or by digital signals (digitally-controlled VGA, also known as a digital Variable Gain Amplifier or DVGA). Analog-controlled VGAs offer continuous gain adjustment, while digital VGAs provide discrete steps of gain adjustment. In an AFE circuit, the VGA is typically positioned after the initial low-noise amplifier (LNA) and any necessary filtering stages. The VGA can adjust the signal level before it is sent to the analog-to-digital converter (ADC). By adjusting the signal level, the VGA ensures that the ADC operates within its optimal input range, avoiding clipping or underutilization of the ADC's dynamic range.

Figure 3:
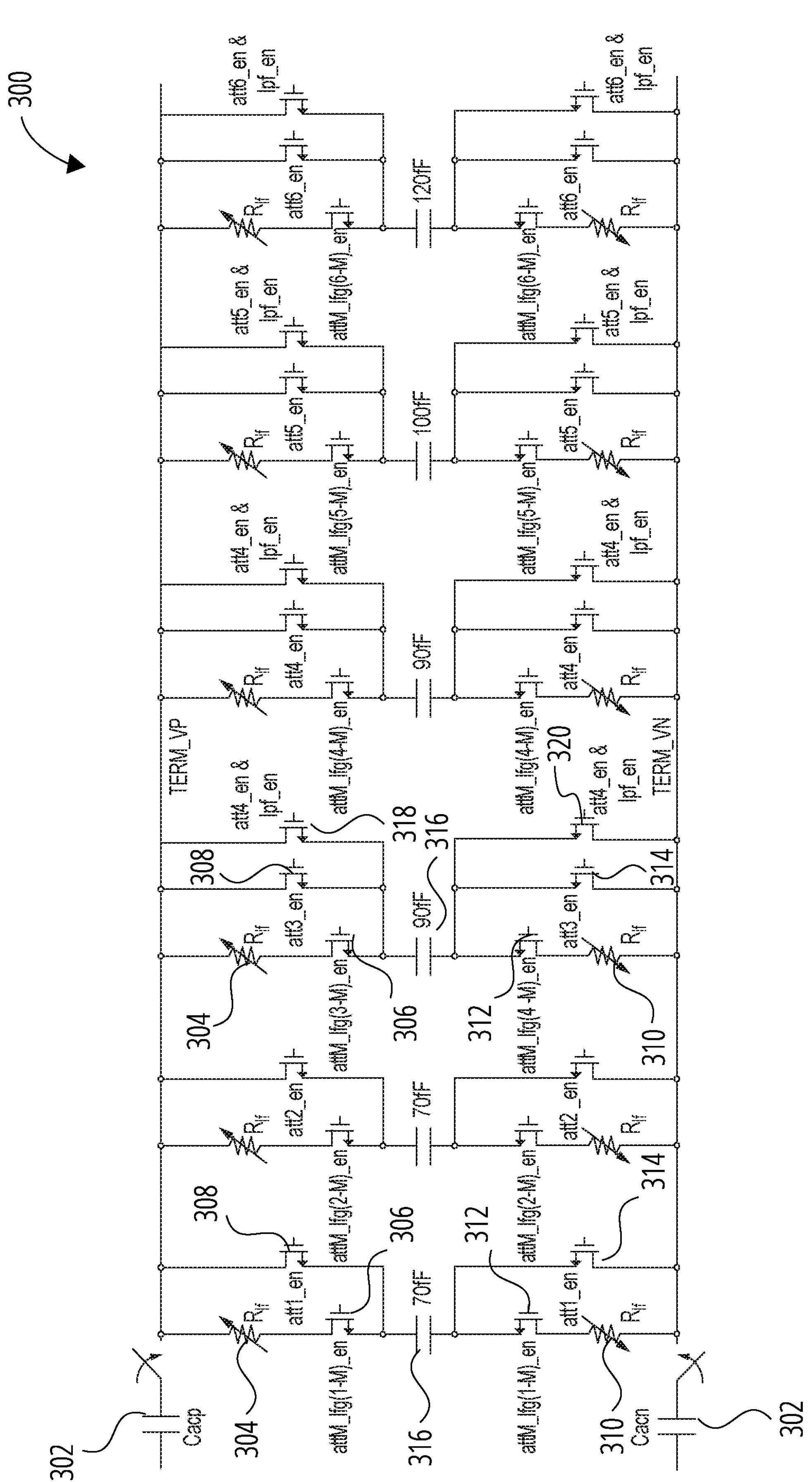
FIG. 3 is a circuit diagram of a passive RLC network according to at least one embodiment.

Although FIG. 3 illustrates a differential CTLE, in another embodiment, the CTLE can be a single-ended CTLE. In this embodiment, the CTLE includes a single-ended input terminal and a single-ended output terminal. A load component, such as load component (load capacitor or load resistor) is coupled to the single-ended output terminal. An example of the programmable passive RLC network 204 is illustrated and described with respect to FIG. 3.

FIG. 3 is a circuit diagram of a programmable passive RLC network 300 according to at least one embodiment. The programmable passive RLC network 300 includes the AC capacitors 302, which are similar to the AC capacitor 222 of FIG. 2. The programmable passive RLC network 300 can include T-coil inductors, such as those illustrated in FIG. 2. The programmable passive RLC network 300 includes a set of branches coupled between differential inputs, each branch including a first variable resistor 304, a first switch 306 coupled in series with the first variable resistor 304, a second switch 308 coupled in parallel with the first variable resistor 304 and the first switch 306, a second variable resistor 310, a third switch 312 coupled in series with the second variable resistor 310, a fourth switch 314 coupled in parallel with the second variable resistor 310 and the third switch 312, and a capacitor 316 coupled between the first switch 306 and the third switch 312. In at least one embodiment, one or more of the branches can include a fifth switch 318 coupled in parallel with the second switch 308, and a sixth switch 320 coupled in parallel with the fourth switch 314.

As described herein, the AC capacitors 302 and the programmable capacitor divider networks, as implemented as the selection or enabling of different combinations of branches, can support wide-range of AC attenuations, such as from 1 to 7 dB. The programmable resistor divider network, as implemented as the selection or enabling of different combinations of branches, can achieve wide-range of DC attenuation to match the AC attenuation for a flat response across the whole frequency spectrum. The programmable passive RLC network 300 can also provide LTEQ and LPF through the branches of the programmable capacitor divider network (AC capacitors 302 and capacitor 316 of the programmable passive RLC network 300. In some embodiments, the capacitors capacitor 316 of the different branches can have different capacitance values.

In at least one embodiment, the switches can be controlled by downstream controllers, such as an AGC block, which can control the attenuation, or an EQ block that can control the LTEQ and LPF provided by the programmable passive RLC network 300. In at least one embodiment, the EQ block can control the fifth switch 318 and the sixth switch 320 to provide LPF.

In at least one embodiment, the programmable passive RLC network 300 is coupled to differential inputs of a VGA. In another embodiment, a single-ended version of the programmable passive RLC network 300 can be coupled to an single-ended input of a CTLE or a VGA.

Example graphs of the programmable passive RLC network 300 are illustrated and described below with respect to FIG. 4A, FIG. 4B, and FIG. 4C.

Figure 4A:
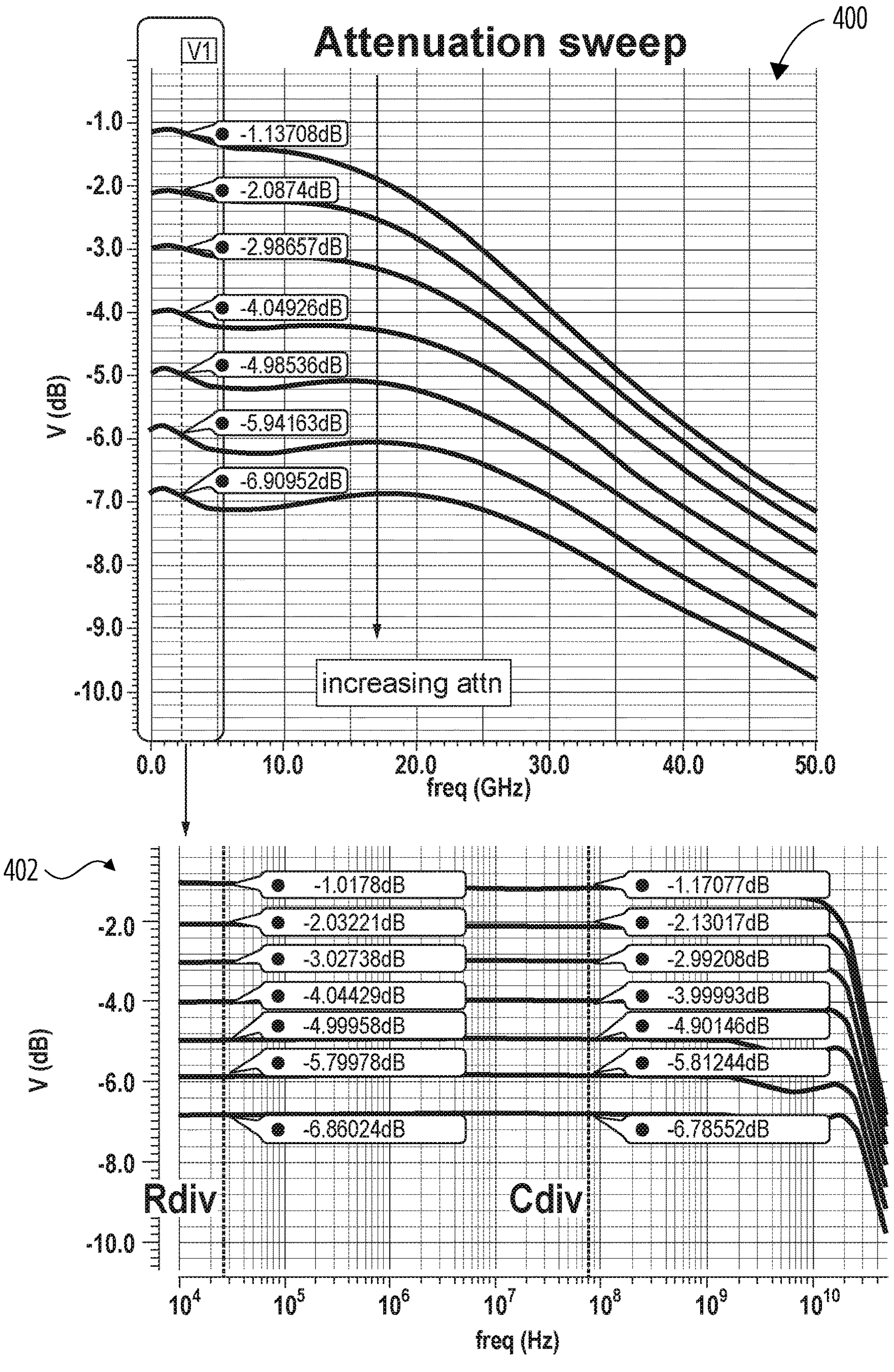
FIG. 4A is a graph illustrating a frequency response and attenuation sweep of different attenuation steps by switching in different combination of capacitors of the programmable passive RLC network according to at least one embodiment.

FIG. 4A is a graph 400 illustrating a frequency response of an attenuation sweep of different attenuation steps by switching in different combination of capacitors of the programmable passive RLC network 300 according to at least one embodiment. As illustrated in the exploded view of a portion of the attenuation sweep in FIG. 4A, there is about 1 dB per attenuation step with the programmable passive RLC network 300. FIG. 4A shows the AGC function (i.e., provide attenuation from 1-7 dB with 1 dB per step).

Figure 4B:
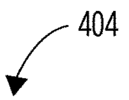
FIG. 4B is a graph illustrating a frequency response of increasing low frequency gain (LFG) and increasing low frequency pole (LFP) according to at least one embodiment.
Figure 4B:
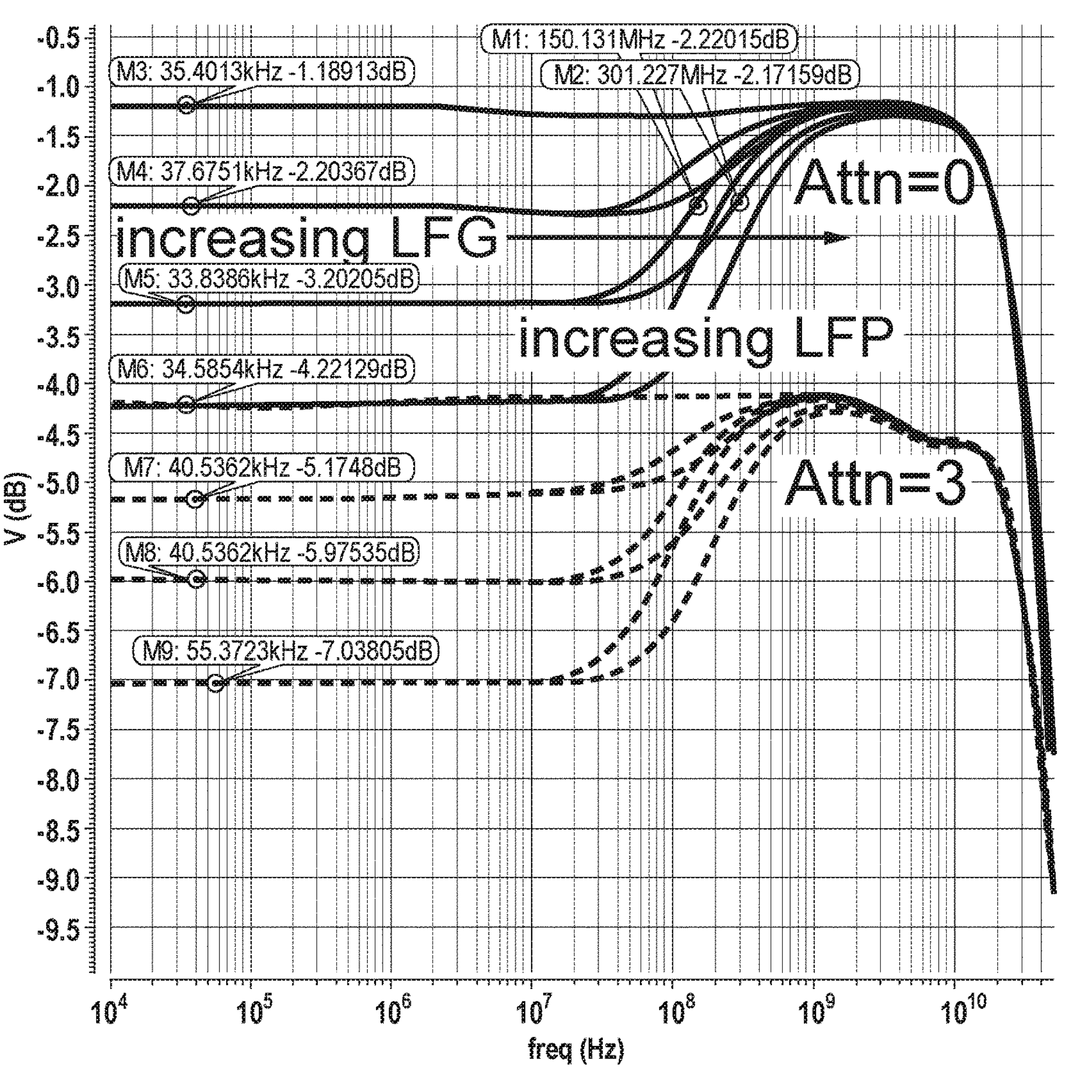

FIG. 4B is a graph 404 illustrating a frequency response of increasing LFG and increasing LFP according to at least one embodiment. FIG. 4B shows the long tail equalization function with different attenuations.

Figure 4C:
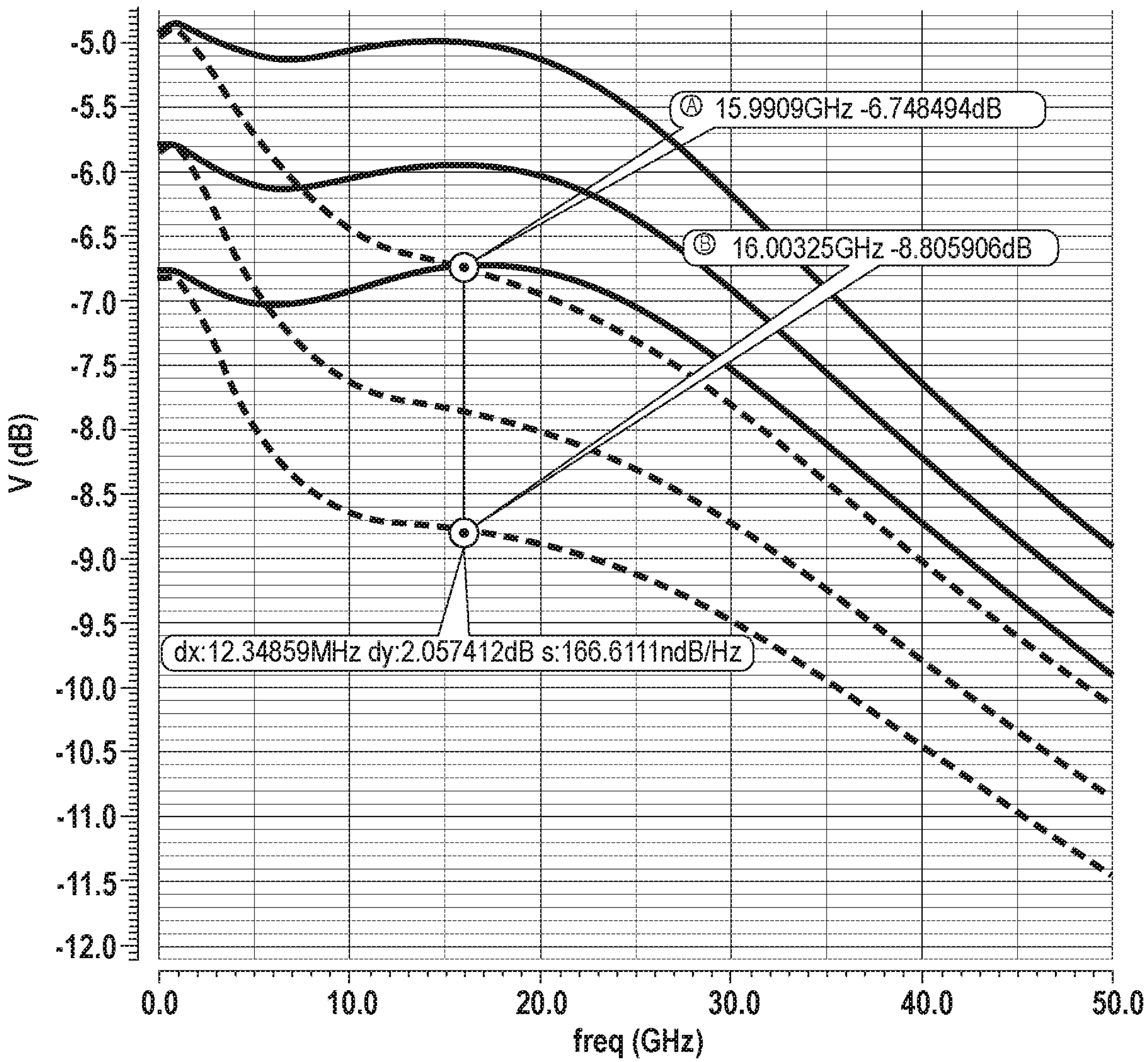
FIG. 4C is a graph illustrating a frequency response of LPF on and LPF off according to at least one embodiment.

FIG. 4C is a graph 406 illustrating a frequency response of LPF on and LPF off according to at least one embodiment. It should be noted that LTEQ is not supported with high attenuation, with max loss of −7 dB, and LPF is only supported with high attenuation (e.g., controlled by ctle_hfg=3, with ~2.1 dB additional loss at 16 GHz). FIG. 4C shows the LPF function with different attenuations.

The following description is provided to further describe operations of the front-end equalizer circuit 200 during different modes of operation, including a normal AC-coupled mode, a normal DC-coupled mode, a FELS operation in a normal mode, a FELS AC-coupled squelch mode, a FELS DC-coupled squelch mode, and a CTLE voltage offset calibration squelch mode.

Figure 5A:
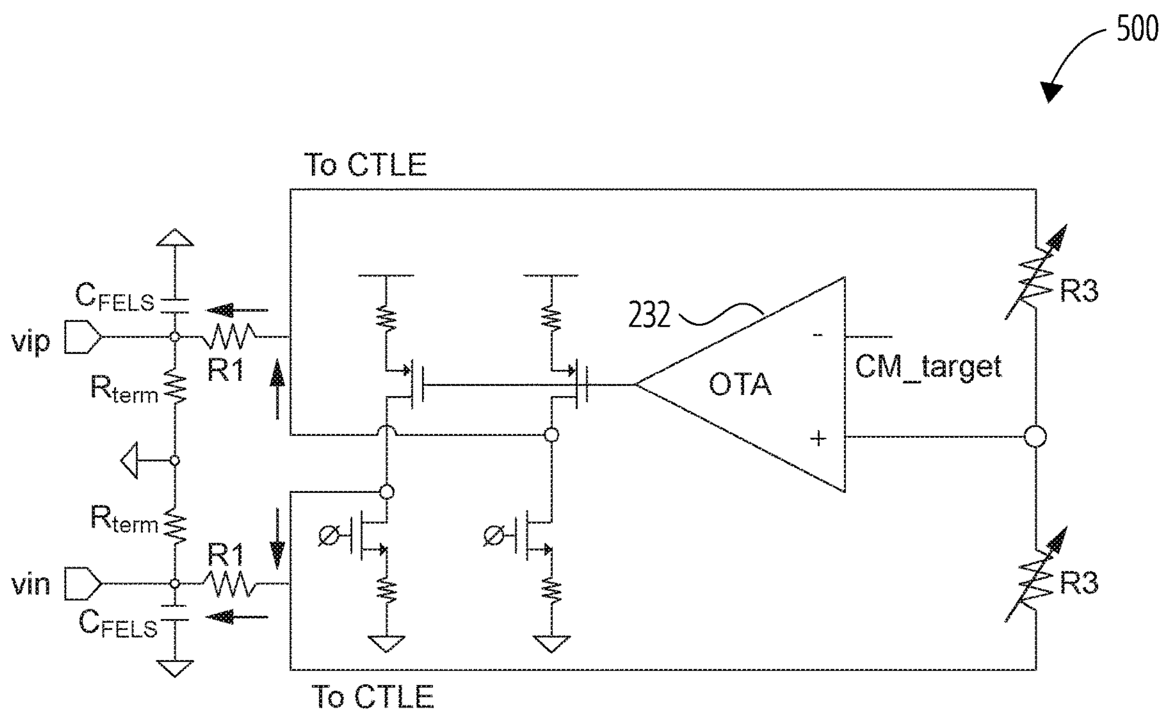
FIG. 5A is a circuit diagram of an AC-coupled mode of the FELS CMFB circuit of FIG. 2 according to at least one embodiment.

FIG. 5A is a circuit diagram of an AC-coupled mode 500 of the FELS CMFB circuit 202 of FIG. 2 according to at least one embodiment. The FELS CMFB circuit 202 can operate in this manner in both a normal AC-coupled mode and FELS calibration modes. In the AC-coupled mode 500, the level shifting (LS) can have a fixed voltage (e.g., 0=>CM target). The FELS CMFB circuit 202 includes the operational amplifier 232. The operational amplifier 232 can be a folded-cascode for high output impedance. The operational amplifier 232 can provide a control signal (CS) to the adjustable current source 216. The CS can provide a common centroid layer for better matching together with resistor degeneration.

Figure 5B:
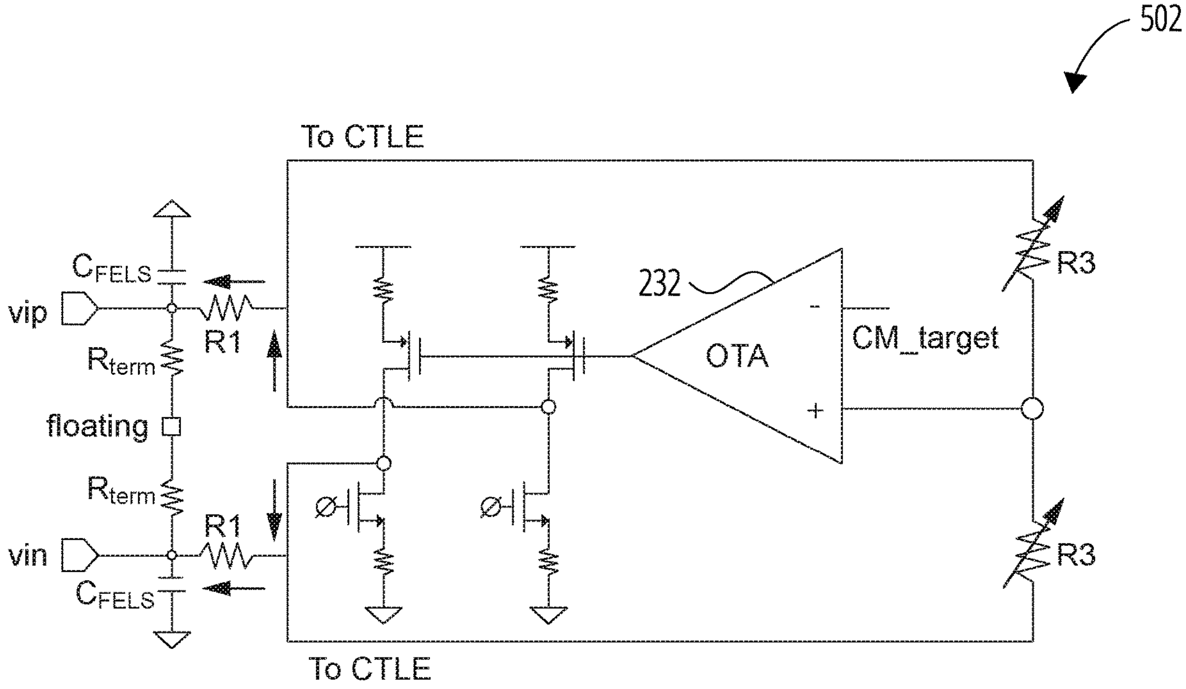
FIG. 5B is a circuit diagram of a normal DC-coupled mode of the FELS CMFB circuit of FIG. 2 according to at least one embodiment.

FIG. 5B is a circuit diagram of a normal DC-coupled mode 502 of the FELS CMFB circuit 202 of FIG. 2 according to at least one embodiment. In the normal DC-coupled mode 502, there can be an agnostic TX CM signal.

Figure 5C:
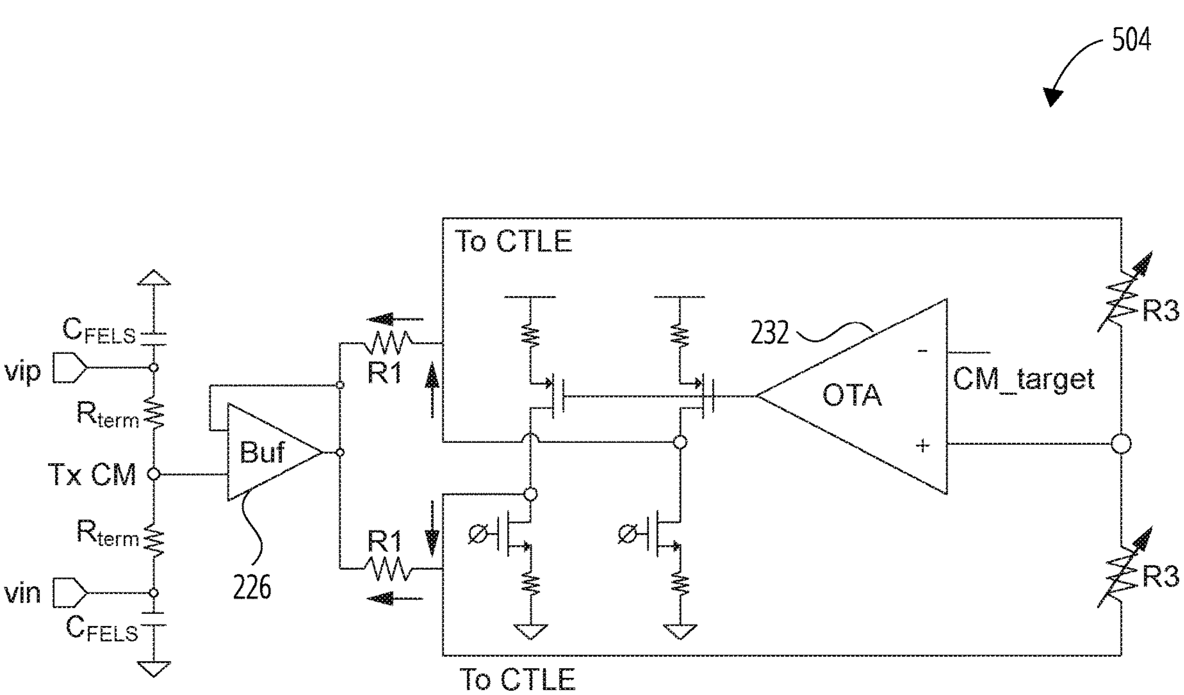
FIG. 5C is a circuit diagram of a FELS calibration DC-coupled mode of the FELS CMFB circuit of FIG. 2 according to at least one embodiment.

FIG. 5C is a circuit diagram of a FELS offset calibration DC-coupled mode 504 of the FELS CMFB circuit 202 of FIG. 2 according to at least one embodiment. In the FELS offset calibration DC-coupled mode 504, the agnostic TX CM signal is tracked by the CM buffer 226. The CM buffer 226 can be provide a 2-stage operational amplifier for high output CM range (e.g., 80-450 mV).

Figure 6:
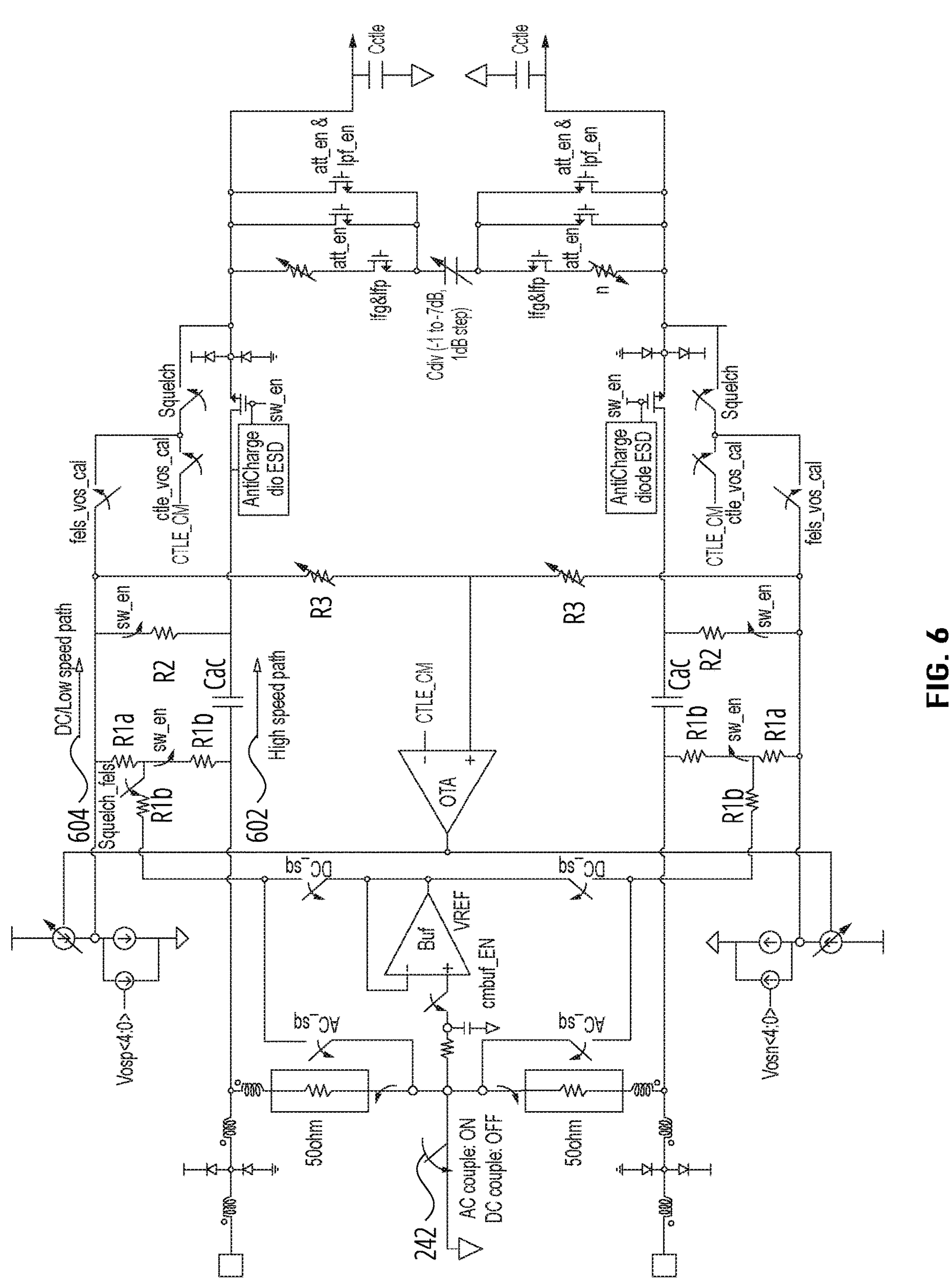
FIG. 6 is a circuit diagram of a FELS operation in a normal mode of the front-end equalizer circuit of FIG. 2 according to at least one embodiment.

FIG. 6 is a circuit diagram of a FELS operation in a normal mode 600 of the front-end equalizer circuit 200 of FIG. 2 according to at least one embodiment. The front-end equalizer circuit 200 can provide a high-speed AC path 602 and a low-speed DC path 604. The switch 242 can be turned on for the AC-coupled mode and turned off for the DC-coupled mode. In the AC-coupled mode, the terminals can receive a fixed incoming CM signal that is greater than zero (e.g., fixed incoming CM=>0) for one or more communication standards (e.g., PCIe, USB). In the DC-coupled mode, the terminals can receive an agnostic incoming CM signal. For example, the incoming agnostic CM signal is between 80-310 mV for one communication standard (e.g., MPHY), and between 450-500 mV for another communication standard (e.g., UPHY). The CM target for the analog signal processing circuit 214 (e.g., CTLE input) can track process, voltage, and temperature (PVT).

Figure 7:
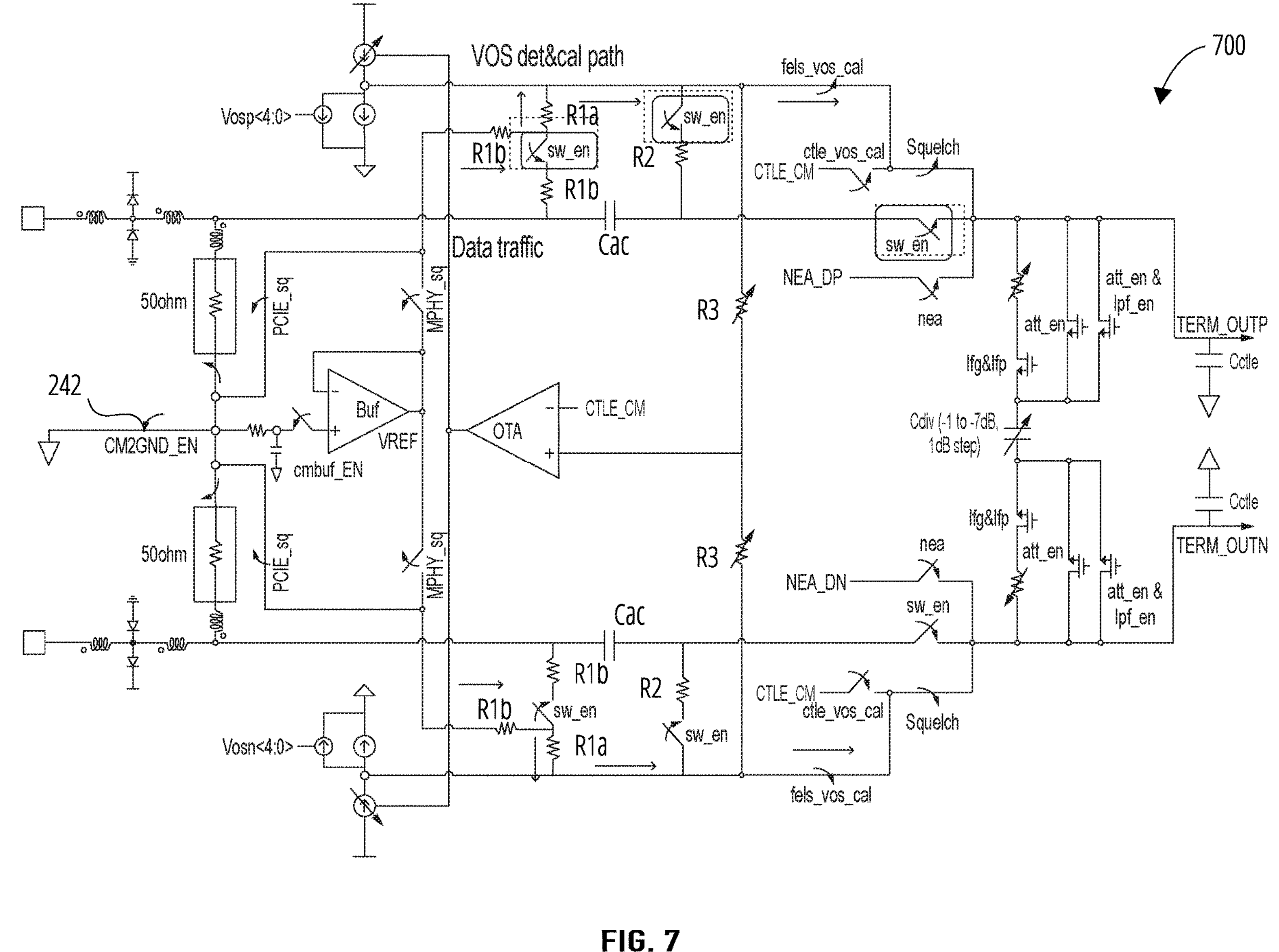
FIG. 7 is a circuit diagram of a FELS AC-coupled squelch mode of the front-end equalizer circuit of FIG. 2 according to at least one embodiment.

FIG. 7 is a circuit diagram of a FELS AC-coupled squelch mode 700 of the front-end equalizer circuit 200 of FIG. 2 according to at least one embodiment. In the FELS AC-coupled squelch mode 700, the switch 242 can be enabled to couple the CM voltage to ground, similar to the normal AC-coupled mode. The incoming CM signal can be around 450 mV. The signal path may not be quiet during calibration, so the traffic is blocked through switches. During offset calibration, the sw_en off could help isolate the interference from incoming data traffic to improve calibration accuracy.

Figure 8:
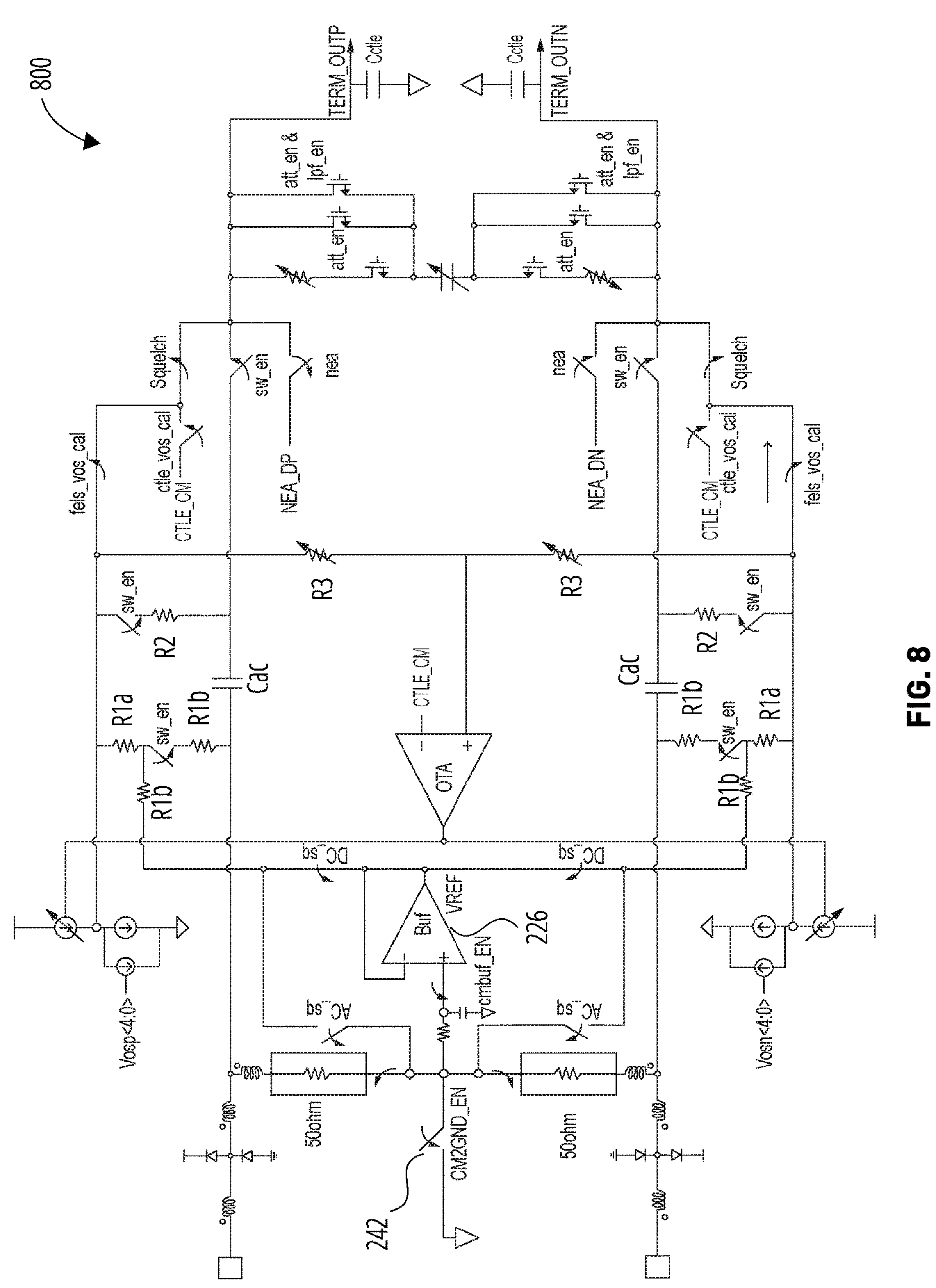
FIG. 8 is a circuit diagram of a FELS DC-coupled squelch mode of the front-end equalizer circuit of FIG. 2 according to at least one embodiment.

FIG. 8 is a circuit diagram of a FELS DC-coupled squelch mode 800 of the front-end equalizer circuit 200 of FIG. 2 according to at least one embodiment. In the FELS DC-coupled squelch mode 800, the switch 242 can be disabled to keep the CM voltage floating. The incoming agnostic CM signal can be around 80-310 mV and level shifted to approximately 450 mV (target CM 228). During calibration, the CM buffer 226 can track the Tx incoming agnostic CM signal and isolate the interference from incoming data traffic to improve calibration accuracy.

Figure 9:
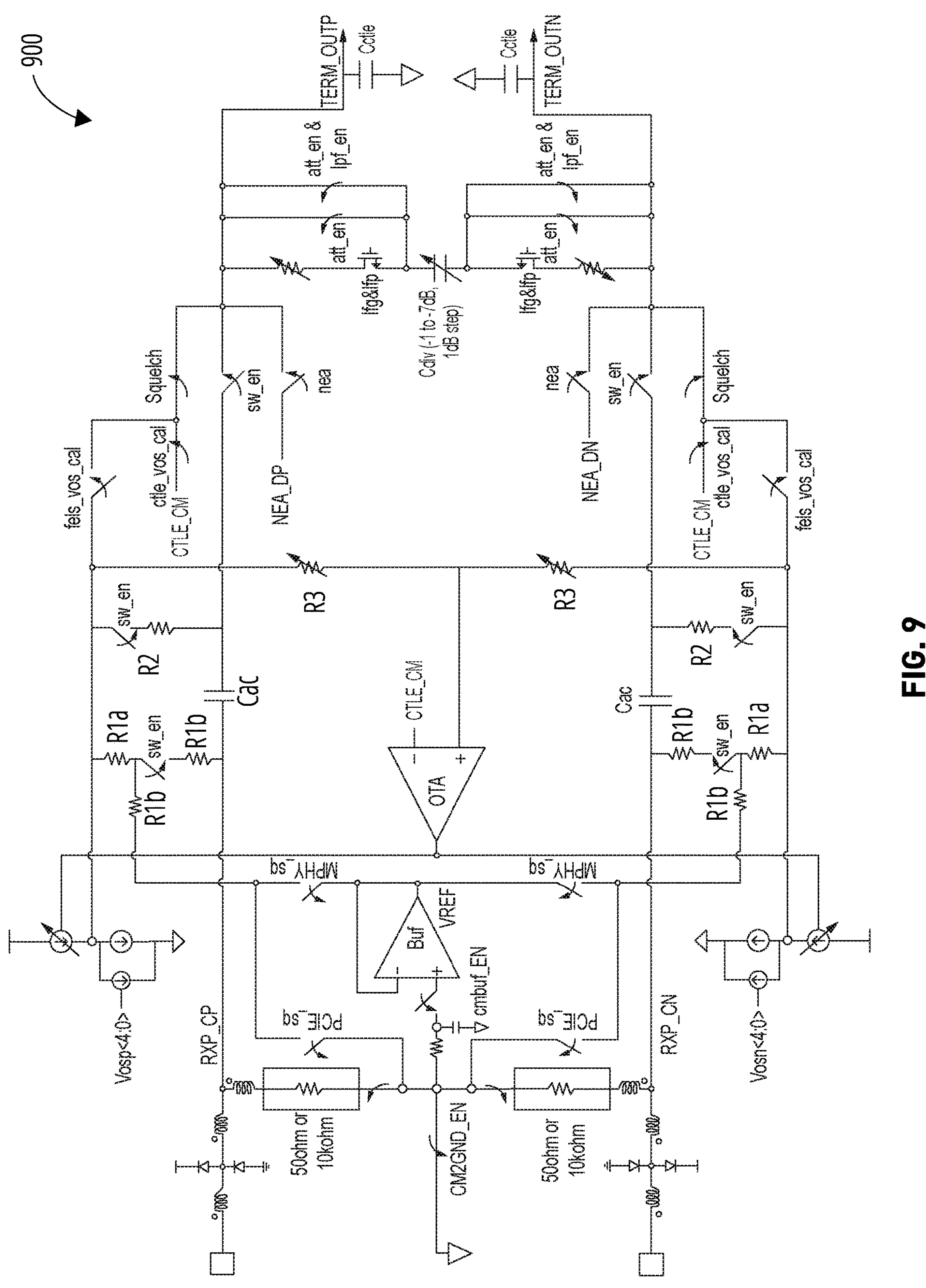
FIG. 9 is a circuit diagram of a Continuous-Time Linear Equalizer (CTLE) voltage offset calibration squelch mode of the front-end equalizer circuit of FIG. 2 according to at least one embodiment.

FIG. 9 is a circuit diagram of a CTLE voltage offset calibration squelch mode 900 of the front-end equalizer circuit 200 of FIG. 2 according to at least one embodiment. In the CTLE voltage offset calibration squelch mode 900, the FELS output is shorted to the target CM 228 for the CTLE (analog signal processing circuit 214).

Figure 10:
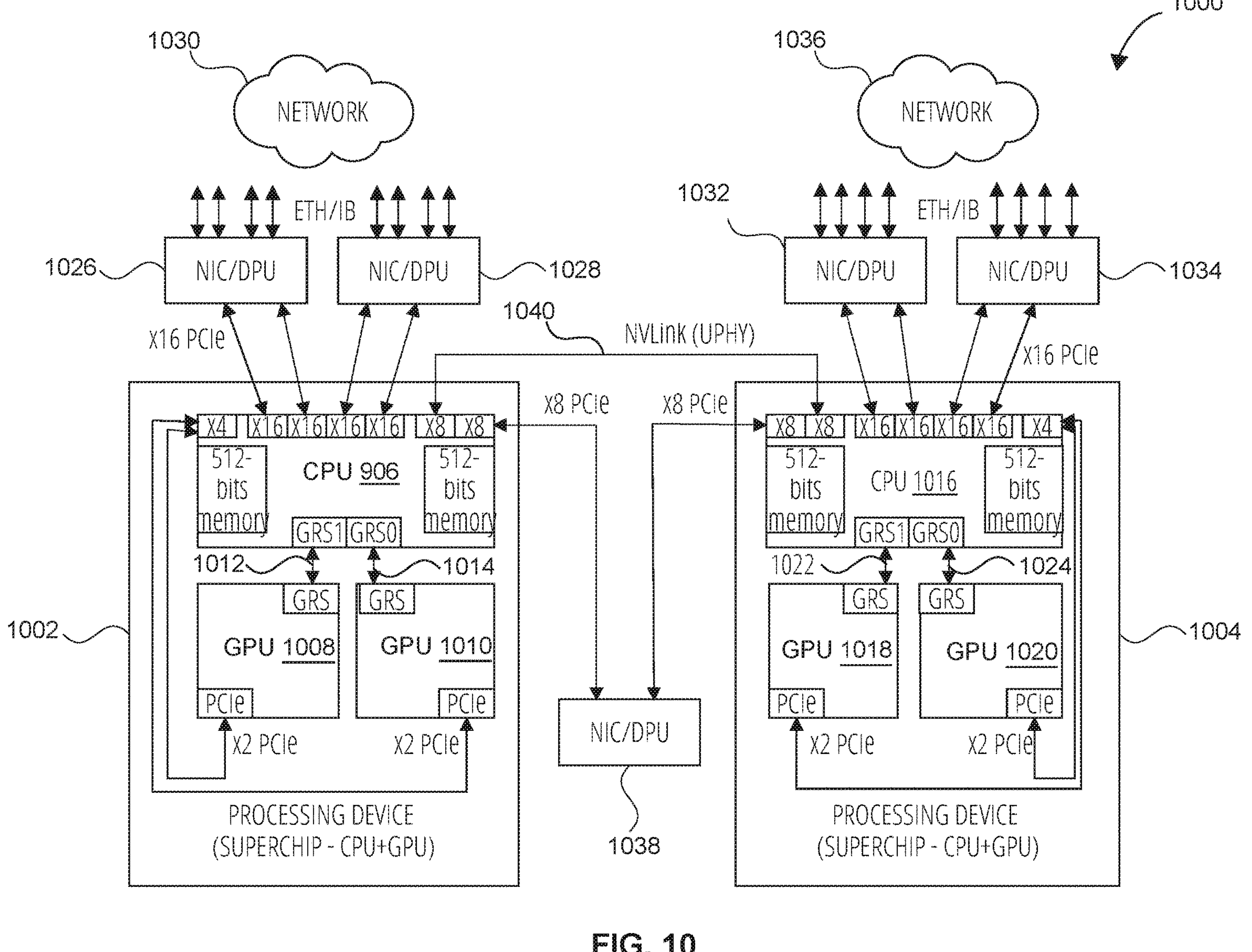
FIG. 10 is a block diagram of a computing system having two processing devices coupled to each other and multiple networks according to at least one embodiment.

FIG. 10 is a block diagram of a computing system 1000 having two processing devices coupled to each other and multiple networks according to at least one embodiment. The computing system 1000 is designed with multiple integrated circuits (referred to as processing devices), where each integrated circuit includes a CPU and two GPUs, forming a powerful and flexible architecture. These processing devices are interconnected via an NVLink (or other high-speed interconnect), enabling high-speed communication between the processing devices, and are also connected through a Network Interface Card (NIC) or Data Processing Unit (DPU) to ensure efficient data transfer across the computing system 1000. The coupling of processing devices through NVLink allows for seamless data exchange and parallel processing, enhancing overall computational performance. Additionally, these processing devices are connected to multiple networks through one or more network interface cards (NICs) or DPUs, enabling the system to handle complex, multi-network tasks with high bandwidth and low latency. This configuration makes the computing system digital data source 120 highly suitable for demanding applications that require significant processing power, such as artificial intelligence (AI), machine learning (ML), and data-intensive computing, while ensuring robust connectivity and scalability across various networked environments. The integrated circuits of the computing system 1000 can include one or more CPUs and one or more GPUs. An example architecture of a multi-GPU architecture is illustrated in FIG. 10.

As illustrated in FIG. 10, the computing system 1000 includes a processing device 1002 with a multi-GPU architecture. In particular, the processing device 1002 includes a CPU 1006, a GPU 1008, and a GPU 1010. The CPU 1006 can be coupled to the GPU 1008 via an die-to-die (D2D) or chip-to-chip (C2C) interconnect 1012, such as a Ground-Referenced Signaling interconnect (GRS interconnect). The CPU 1006 can be coupled to the GPU 1010 via a D2D or C2C interconnect 1014. The CPU 1006 can also couple to the GPU 1008 and GPU 1010 via PCIe interconnects. The CPU 1006 can be coupled to one or more network interface cards (NICs) or data processing units (DPUs), which are coupled to one or more networks. For example, as illustrated in FIG. 10, the CPU 1006 is coupled to a first NIC/DPU 1026, which is coupled to a network 1030. The CPU 1006 is also coupled to a second NIC/DPU 1028, which is coupled to the network 1030. The NIC/DPU 1026 and NIC/DPU 1028 can be coupled to the network 1030 over Ethernet (ETH), NVLink, or InfiniBand (IB) connections.

The computing system 1000 also includes a processing device 1004 with a multi-GPU architecture. In particular, the processing device 1004 includes a CPU 1016, a GPU 1018, and a GPU 1020. The CPU 1016 can be coupled to the GPU 1018 via an D2D or C2C interconnect 1022. The CPU 1016 can be coupled to the GPU 1020 via a D2D or C2C interconnect 1024. The CPU 1016 can also couple to the GPU 1018 and GPU 1020 via PCIe interconnects. The CPU 1016 can be coupled to one or more NICs or DPUs, which are coupled to one or more networks. For example, as illustrated in FIG. 10, the CPU 1016 is coupled to a first NIC/DPU 1032, which is coupled to a network 1036. The CPU 1016 is also coupled to a second NIC/DPU 1034, which is coupled to the network 1036. The NIC/DPU 1032 and NIC/DPU 1034 can be coupled to the network 1036 over Ethernet (ETH), NVLink, or InfiniBand (IB) connections.

In at least one embodiment, the processing device 1002 and the processing device 1004 can communication with each other via a NIC/DPU 1038, such as over PCIe interconnects. The processing device 1002 and processing device 1004 can also communicate with each other over a high-bandwidth communication interconnects 1040, such as an NVLink interconnect or other high-speed interconnects.

The computing system 1000 includes various types of interconnects. Each of the interconnects includes various RX AFE circuits (also referred to as RX AFE sub-blocks). These RX AFE circuits can include the front-end equalizer circuits, as described herein.

In at least one embodiment, the front-end equalizer circuit 200 is part of a receiver analog front-end circuit (RX AFE circuit). The RX AFE circuit can be part of Serializer/Deserializer circuit (SerDes circuit). The SerDes circuit can be a transceiver that converts parallel data to serial data and vice versa. SerDes circuits can facilitate transmission between two devices over serial streams, reducing the number of data paths, wires/traces, terminals, etc. SerDes circuits can include one or more RX AFE circuits, which are coupled between terminals and analog-to-digital converters (ADC) of the SerDes circuit. The SerDes circuit can also include other components, such as a clock-recovery circuit, equalization blocks, symbol detectors. In at least one embodiment, the clock-recovery circuit includes a feedback loop with a phase detector, a filter, and a controlled oscillator (CO) in a closed feedback loop. The CO can be a digitally-controlled oscillator (DCO), a voltage-controlled oscillator (VCO), or the like, as described herein. The ADC generates samples of an incoming data signal. The equalization block can determine current data based on the samples and provides an equalization output. The equalization output can be used by the phase detector to determine the phase information. The phase detector can measure a phase offset corresponding to the current data. The filter can filter the phase offset and control the CO based on the filtered phase offset.

Figure 11:
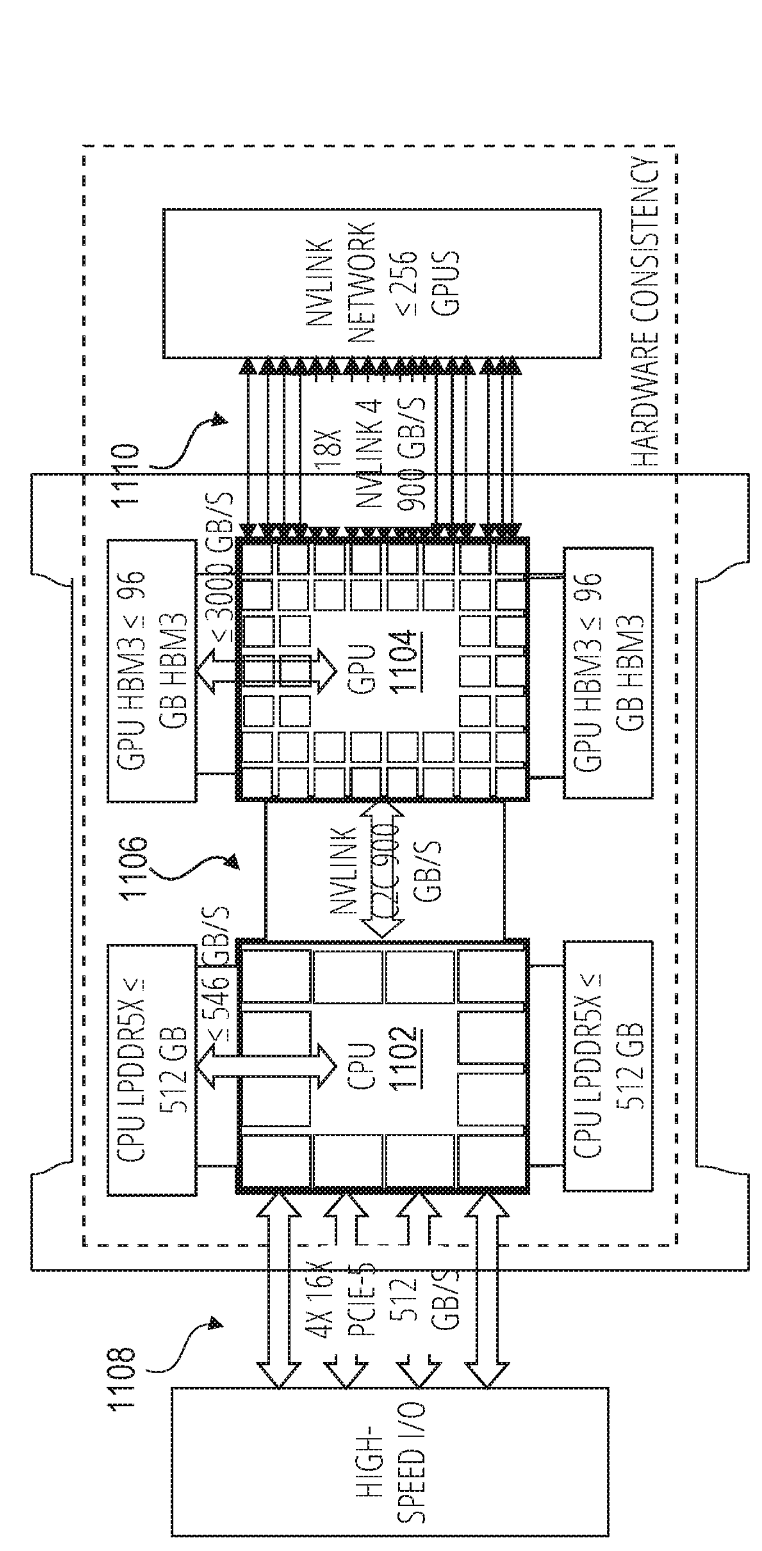
FIG. 11 is a block diagram of a computing system having a central processing unit (CPU) and a graphics processing unit (GPU) in a single integrated circuit according to at least one embodiment.

FIG. 11 is a block diagram of a computing system 1100 having a CPU 1102 and a GPU 1104 in a single integrated circuit according to at least one embodiment. The computing system 1100 can be a highly integrated design where a CPU 1102 and GPU 1104 are connected on a single integrated circuit, utilizing an NVLink C2C (Chip-to-Chip) interconnect 1106 to enable fast, low-latency communication between the two processing units. This close integration allows for efficient data transfer and parallel processing between the CPU 1102 and GPU 1104, optimizing performance for complex computational tasks. The GPU elements within the computing system 1100 can be interconnected using an NVLink network, allowing for scalability up to 256 GPU elements, creating a powerful, unified processing environment ideal for large-scale AI, ML, and high-performance computing applications. The NVLink network can be a GPU fabric of high-bandwidth communication interconnects 1110. Additionally, the computing system 1100 can be designed to interface with a high-speed I/O through PCIe interconnects 1108, ensuring rapid data transfer to and from external devices, further enhancing the system's capabilities in handling data-intensive tasks and providing robust connectivity to peripheral components. It should be noted that the C2C interconnects 1106 can be considered D2D interconnects since the CPU 1102 and the GPU 1104 are located on the same integrated circuit. The integrated circuit can include CPU memory (also referred to as main memory) and GPU memory, which are accessible by the CPU 1102 and the GPU 1104, respectively, over high-speed interconnects. The computing system 1100 can bring together performance of the GPU 1104 with the versatility of the CPU 1102. The CPU 1102 can be connected with a high-bandwidth and memory coherent C2C interconnects 1106 in a single integrated circuit. The computing system 1100 can support a link switch system.

The computing system 1100 includes various types of interconnects. Each of the interconnects includes various RX AFE circuits (also referred to as RX AFE sub-blocks). These RX AFE circuits can include the front-end equalizer circuit 200, as described herein.

Figure 12:
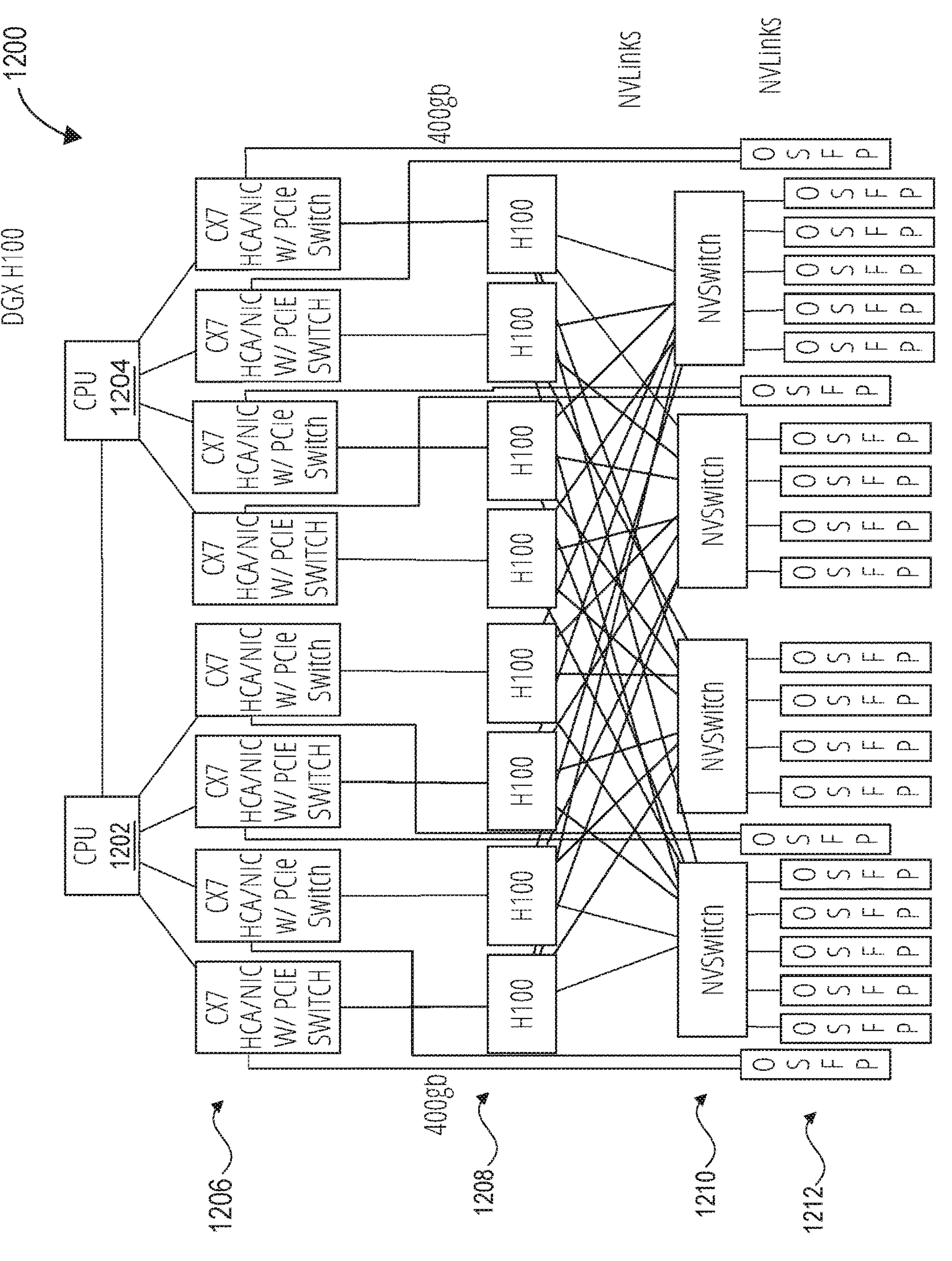
FIG. 12 is a block diagram of a computing system having tensor core graphics processing units (GPUs) according to at least one embodiment.

FIG. 12 is a block diagram of a computing system 1200 having tensor core GPUs 1208 according to at least one embodiment. The computing system 1200 can be a DBX H100 system, which is a high-performance computing platform designed to meet the demands of AI, ML, and deep learning (DL) workloads. The computing system 1200 can include multiple tensor core GPUs 1208 (e.g., NVIDIA H100 Tensor Core GPUs). The tensor core GPUs 1208 can each be one of the integrated circuits described above with respect to FIG. 11. The tensor core GPUs 1208 can be optimized for AI/ML/DL applications, offering exceptional performance for deep learning training, inference, and high-performance computing tasks. The tensor core GPUs 1208 within the computing system 1200 are interconnected using high-speed communication interfaces like NVLinks, enabling rapid data transfer between them, which is crucial for handling large-scale AI models and datasets with low latency. This computing system 1200 is designed for scalability, allowing for the integration of additional GPUs as required, making it versatile enough for research, development, and deployment in data centers for production AI workloads. Each GPU is equipped with Tensor Cores, specialized processing units that accelerate matrix operations, a fundamental component of AI and deep learning algorithms. These Tensor Cores enable the system to perform mixed-precision calculations efficiently, balancing speed and accuracy. Given the power consumption and heat generation of multiple tensor core GPUs 1208, the computing system 1200 can include advanced cooling solutions and power management features to ensure safe operation while maintaining peak performance. It is supported by a comprehensive software ecosystem, including NVIDIA's Compute Unified Device Architecture (CUDA) programming model, AI frameworks like TensorFlow and PyTorch, and other HPC and AI software tools, which enable developers and researchers to harness the full power of the tensor core GPUs 1208 for their specific applications. The computing system 1200 is ideally suited for large-scale AI model training, real-time inference, scientific simulations, data analytics, and other compute-intensive tasks that require massive parallel processing power.

The tensor core GPUs 1208 can be coupled to multiple CPUs, such as CPU 1202 and CPU 1204, using switches 1206 (e.g., CX7 HCA/NIC with PCIe switch). The tensor core GPUs 1208 can be coupled to each other via switches 1210 (e.g., NVSwitches). The switches 1206 and switches 1210 can be coupled to high-speed transceiver modules 1212. The high-speed transceiver modules 1212 can be Octal Small Form-factor Pluggable (OSFP) modules. OSFP modules refer to high-speed transceiver modules designed for rapid data communication, particularly in environments requiring significant bandwidth, such as data centers and high-performance computing systems. These modules support extremely high data rates, typically up to 400 Gbps per module, with future capabilities extending to 800 Gbps or more. OSFP modules interface with the system via the PCIe interface, enabling fast and efficient data transfer between the integrated CPU-GPU components and external networks or other connected systems. Their hot-pluggable nature allows for easy insertion or removal without the need to power down the system, offering flexibility and ease of maintenance, which is crucial in critical-uptime environments. Additionally, OSFP modules are designed for high density, maximizing the number of high-speed connections within limited space, such as in densely packed server racks. By adhering to the latest networking standards, OSFP modules ensure the computing system 1200 remains capable of meeting increasing data demands and can be upgraded to support future advancements in network speeds, thus contributing to the system's overall performance and scalability.

In at least one embodiment, the computing system 1200 can be considered a data-network configuration with full-bandwidth intra-server NVLinks. In this example, all eight tensor core GPUs 1208 can simultaneously saturate eighteen NVLinks to other GPUs within the server. The bandwidth is limited by over-subscription from multiple other GPUs. In another embodiments, data-network configuration can be a half-bandwidth intra-server NVLinks. In this example, all eight tensor core GPUs 1208 can half-subscribe eighteen NVLinks to GPUs in other servers. Four tensor core GPUs 1208 can saturate eighteen NVLinks to GPUs in other servers. This is equivalent of full-bandwidth on AllReduce with Scalable Hierarchical Aggregation and Reduction Protocol (SHARP). The reduction in all-2-all (All2All) bandwidth is a balance with server complexity and costs. In at least one embodiment, all eight tensor core GPUs 1208 can independently transfer data, using Remote Direct Memory Access (RDMA) protocol, over its own dedicated switch (e.g., 400 Gb/s HCA/NIC) in an multi-rail InfiniBand/Ethernet configuration. In this example, 800 GBps of aggregate full-duplex to non-NVLink network devices.

The computing system 1200 includes various types of interconnects. Each of the interconnects includes various RX AFE circuits (also referred to as RX AFE sub-blocks). These RX AFE circuits can include the front-end equalizer circuit 200, as described herein.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure, and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still cooperate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a Media Access Control Security (MACsec) device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or parallel, continuously, or intermittently. In at least one embodiment, the terms "system" and "method" are used herein interchangeably as far as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A receiver device comprising:

an input terminal;

an analog signal processing circuit; and a front-end equalizer circuit coupled between the input terminal and the analog signal processing circuit, wherein the front-end equalizer circuit comprises a programmable common mode feedback (CMFB) circuit and a passive resistor-inductor-capacitor (RLC) network, wherein:

the programmable CMFB circuit is to receive, from the input terminal, an incoming agnostic common-mode (CM) signal having a first voltage level and a differential peak-to-peak voltage in at least one of an alternating current coupled mode (AC-coupled mode) or a direct current-coupled mode (DC-coupled mode);

the programmable CMFB circuit is to level shift the incoming agnostic CM signal to a CM signal having a second voltage level using an adjustable current source, the second voltage level corresponding to the analog signal processing circuit; and the passive RLC network is to provide AC attenuation and DC attenuation over an attenuation range, while providing boost for long tail equalization (LTEQ) and low-pass filtering (LPF) for the analog signal processing circuit.

2. The receiver device of claim 1, wherein the first voltage level is between 0 and 500 millivolts (mV) in a first communication standard or between 80 and 310 mV in a second communication standard, wherein a differential peak-to-peak voltage is between 800 mV and 1.3 V, wherein the second voltage level is 450 mV, and wherein the attenuation range is between approximately 1 to 7 decibels (dB).

3. The receiver device of claim 1, wherein the front-end equalizer circuit further comprises squelch circuits for calibrating an offset of the front-end equalizer circuit in the AC-coupled mode and the DC-coupled mode.

4. The receiver device of claim 1, wherein the programmable CMFB circuit is to provide a direct current (DC) path to compensate a baseline wander of the front-end equalizer circuit, while level shifting the incoming agnostic CM signal to the second voltage level.

5. The receiver device of claim 1, wherein the programmable CMFB circuit comprises:

a front-end level-shifter (FELS) CMFB circuit to receive the incoming agnostic CM signal and detect the first voltage level and level shift the incoming agnostic CM signal to obtain the CM signal having the second voltage level corresponding to the analog signal processing circuit; and a CM buffer to track the incoming agnostic CM signal in the DC-coupled mode during a FELS squelch operation.

6. The receiver device of claim 5, wherein the front-end equalizer circuit further comprises:

first squelch circuits for the AC-coupled mode to calibrate a first offset of the FELS CMFB circuit; and second squelch circuits for the DC-coupled mode to calibrate a second offset of the analog signal processing circuit.

7. The receiver device of claim 1, wherein the passive RLC network comprises:

an alternating current (AC) capacitor;

a T-coil inductor coupled to the input terminal to improve return loss;

a capacitor divider network, the AC capacitor and capacitor divider network to provide the AC attenuation to the CM signal in the AC-coupled mode; and a resistor divider network, the resistor divider network to provide DC attenuation in the DC-coupled mode to match the AC attenuation in the AC-coupled mode.

8. The receiver device of claim 1, wherein the analog signal processing circuit is a Continuous-Time Linear Equalizer (CTLE) having differential inputs, wherein the passive RLC network comprises:

alternating current (AC) capacitors coupled to the differential inputs;

a T-coil inductor coupled to the input terminal to improve return loss; and a plurality of branches coupled between the differential inputs, each branch comprising:

a first variable resistor;

a first switch coupled in series with the first variable resistor;

a second switch coupled in parallel with the first variable resistor and the first switch;

a second variable resistor;

a third switch coupled in series with the second variable resistor;

a fourth switch coupled in parallel with the second variable resistor and the third switch; and a capacitor coupled between the first switch and the third switch.

9. The receiver device of claim 8, wherein at least one of the plurality of branches further comprises:

a fifth switch coupled in parallel with the second switch; and a sixth switch coupled in parallel with the fourth switch.

10. The receiver device of claim 8, wherein the capacitor of at least two of the plurality of branches has different capacitance values.

11. The receiver device of claim 1, wherein the analog signal processing circuit is a Variable Gain Amplifier (VGA) having an input coupled to the front-end equalizer circuit, wherein the input is either a single-ended or differential, wherein the passive RLC network comprises:

alternating current (AC) capacitors coupled between the input terminal and the input of the VGA;

a T-coil inductor coupled to the input terminal; and a plurality of branches coupled to the input of the VGA, wherein each branch comprises:

a first variable resistor;

a first switch coupled in series with the first variable resistor;

a second switch coupled in parallel with the first variable resistor and the first switch; and a capacitor coupled in series with the first switch.

12. A receiver analog front-end (RX AFE) circuit coupled between one or more input terminals and corresponding one or more inputs of an analog signal processing circuit, the RX AFE circuit comprising:

a programmable front-end level-shifter (FELS) CMFB circuit to receive an incoming agnostic CM signal on the one or more input terminals, detect a first voltage level of the incoming agnostic CM signal, and level shift the incoming agnostic CM signal to obtain a CM signal having a second voltage level corresponding to the analog signal processing circuit;

a passive resistor-inductor-capacitor (RLC) network to attenuate the CM signal by an alternating current (AC) attenuation in an AC-coupled mode or a direct current (DC) attenuation in a DC-coupled mode, while providing boost for long tail equalization (LTEQ) and low-pass filtering (LPF) for the analog signal processing circuit; and a CM buffer to track the incoming agnostic CM signal in the DC-coupled mode during a FELS squelch operation.

13. The RX AFE circuit of claim 12, further comprising:

first squelch circuits for the AC-coupled mode to calibrate a first offset of the programmable FELS CMFB circuit; and second squelch circuits for the DC-coupled mode to calibrate a second offset of the analog signal processing circuit.

14. The RX AFE circuit of claim 12, wherein the passive RLC network comprises:
an alternating current (AC) capacitor;
a T-coil inductor to improve return loss;
a capacitor divider network, the AC capacitor and capacitor divider network to provide the AC attenuation to the CM signal in the AC-coupled mode; and
a resistor divider network, the resistor divider network to provide DC attenuation in the DC-coupled mode to match the AC attenuation in the AC-coupled mode.

15. The RX AFE circuit of claim 12, wherein the analog signal processing circuit is a Continuous-Time Linear Equalizer (CTLE) having differential inputs, wherein the passive RLC network comprises:
alternating current (AC) capacitors coupled to the differential inputs; and
a plurality of branches coupled between the differential inputs, each branch comprising:
a first variable resistor;
a first switch coupled in series with the first variable resistor;
a second switch coupled in parallel with the first variable resistor and the first switch;
a second variable resistor;
a third switch coupled in series with the second variable resistor;
a fourth switch coupled in parallel with the second variable resistor and the third switch; and
a capacitor coupled between the first switch and the third switch.

16. The RX AFE circuit of claim 15, wherein at least one of the plurality of branches further comprises:
a fifth switch coupled in parallel with the second switch; and
a sixth switch coupled in parallel with the fourth switch.

17. The RX AFE circuit of claim 15, wherein the capacitor of at least two of the plurality of branches has different capacitance values.

18. A receiver circuit comprising:
differential input terminals;
a Continuous-Time Linear Equalizer (CTLE) having differential inputs; and
an analog front-end (RX AFE) circuit coupled between the differential input terminals and the differential inputs, wherein the RX AFE circuit comprises:
a programmable front-end level-shifter (FELS) CMFB circuit to receive an incoming agnostic CM signal on the differential input terminals, detect a first voltage level of the incoming agnostic CM signal, and level shift the incoming agnostic CM signal to obtain a CM signal having a second voltage level corresponding to the CTLE;
a passive resistor-inductor-capacitor (RLC) network to attenuate the CM signal by an alternating current (AC) attenuation in an AC-coupled mode or a direct current (DC) attenuation in a DC-coupled mode, while providing boost for long tail equalization (LTEQ) and low-pass filtering (LPF) for the CTLE; and
a CM buffer to track the incoming agnostic CM signal in the DC-coupled mode during a FELS squelch operation.

19. The receiver circuit of claim 18, further comprising:
first squelch circuits for the AC-coupled mode to calibrate a first offset of the programmable FELS CMFB circuit; and
second squelch circuits for the DC-coupled mode to calibrate a second offset of the CTLE.

20. The receiver circuit of claim 18, wherein the passive RLC network comprises:
an alternating current (AC) capacitor;
a capacitor divider network, the AC capacitor and capacitor divider network to provide the AC attenuation to the CM signal in the AC-coupled mode; and
a resistor divider network, the resistor divider network to provide DC attenuation in the DC-coupled mode to match the AC attenuation in the AC-coupled mode.

21. The receiver circuit of claim 18, wherein the passive RLC network comprises:
alternating current (AC) capacitors coupled to the differential inputs; and
a plurality of branches coupled between the differential inputs, each branch comprising:
a first variable resistor;
a first switch coupled in series with the first variable resistor;
a second switch coupled in parallel with the first variable resistor and the first switch;
a second variable resistor;
a third switch coupled in series with the second variable resistor;
a fourth switch coupled in parallel with the second variable resistor and the third switch; and
a capacitor coupled between the first switch and the third switch.

22. A system for high-speed network communication, the system comprising:
a processing unit; and
a network interface coupled to the processing unit, wherein the network interface comprises a receiver device comprising:
an input terminal;
an analog signal processing circuit; and
a front-end equalizer circuit coupled between the input terminal and the analog signal processing circuit, wherein the front-end equalizer circuit comprises a programmable common mode feedback (CMFB) circuit and a passive resistor-inductor-capacitor (RLC) network, wherein:
the programmable CMFB circuit is to receive, from the input terminal, an incoming agnostic common-mode (CM) signal having a first voltage level and a differential peak-to-peak voltage in at least one of an alternating current coupled mode (AC-coupled mode) or a direct current-coupled mode (DC-coupled mode);
the programmable CMFB circuit is to level shift the incoming agnostic CM signal to a CM signal having a second voltage level using an adjustable current source, the second voltage level corresponding to the analog signal processing circuit; and
the passive RLC network is to provide AC attenuation and DC attenuation over an attenuation range, while providing boost for long tail equalization (LTEQ) and low-pass filtering (LPF) for the analog signal processing circuit.

23. The system of claim 22, wherein the processing unit comprises at least one of a central processing unit (CPU), a graphics processing unit (GPU), a data processing unit (DPU), a network adapter, a network switch, or an NVLink switch.

* * * * *